(12) United States Patent
Foster et al.

(10) Patent No.: US 12,152,984 B2
(45) Date of Patent: Nov. 26, 2024

(54) SMOKE DETECTORS

(71) Applicant: COMPUTIONICS LTD, Lancashire (GB)

(72) Inventors: Daniel William Foster, Manchester (GB); Stephen Brown, Lancashire (GB)

(73) Assignee: COMPUTIONICS LIMITED (GB)

( * ) Notice: Subject to any disclaimer, the term of this patent is extended or adjusted under 35 U.S.C. 154(b) by 250 days.

(21) Appl. No.: 17/629,712

(22) PCT Filed: Aug. 28, 2020

(86) PCT No.: PCT/EP2020/074162
§ 371 (c)(1),
(2) Date: Jan. 24, 2022

(87) PCT Pub. No.: WO2021/038090
PCT Pub. Date: Mar. 4, 2021

(65) Prior Publication Data
US 2023/0042194 A1  Feb. 9, 2023

(30) Foreign Application Priority Data

Aug. 30, 2019 (GB) .................................... 1912448

(51) Int. Cl.
*G01N 21/53* (2006.01)
*G08B 17/107* (2006.01)

(52) U.S. Cl.
CPC ........... *G01N 21/53* (2013.01); *G08B 17/107* (2013.01)

(58) Field of Classification Search
CPC .............................. G01N 21/53; G08B 17/107
See application file for complete search history.

(56) References Cited

U.S. PATENT DOCUMENTS

2004/0245878 A1  12/2004  Kim et al.
2010/0309013 A1*  12/2010  Liess ...................... G01N 21/53
                                                                        359/833
(Continued)

FOREIGN PATENT DOCUMENTS

GB          2236390 A     4/1991
GB          2401936 A1    11/2004
(Continued)

*Primary Examiner* — Jamil Ahmed
(74) *Attorney, Agent, or Firm* — Clark Hill PLC; James R. Foley

(57) ABSTRACT

A smoke detector of the type that depends on the scattering of light by smoke particles comprising a chamber (301) configured to receive smoke particles from an environment in which the smoke detector is required to detect smoke, a source of light (202) configured to project light therefrom such that light that is received by the chamber is scattered by the smoke particles, an optical element (207) configured to receive light as has been scattered by the smoke particles, and, a photodetector (208) configured to detect at least some of the received scattered light, the smoke detector characterized in that upon receiving the scattered light, the optical element (207) is configured to selectively differentiate between required scattered light that is derived from a subset of predefined directions with respect to the angle of incidence upon the optical element and scattered light that is derived from other directions in order to thereby filter out the light that is not required and thereby redirect the required scattered light onto the photodetector (208).

16 Claims, 18 Drawing Sheets

(56) References Cited

U.S. PATENT DOCUMENTS

| | | |
|---|---|---|
| 2011/0012463 A1 | 1/2011 | Duncan et al. |
| 2012/0299429 A1 | 11/2012 | Choi et al. |
| 2013/0176131 A1 | 7/2013 | Pichard |
| 2017/0194825 A1 | 7/2017 | Nestler |

FOREIGN PATENT DOCUMENTS

| | | |
|---|---|---|
| GB | 2404731 B | 2/2005 |
| GB | 2531495 B | 4/2016 |
| JP | H06 84076 A | 3/1994 |
| JP | 2003 248878 A | 9/2003 |
| JP | 3747830 B2 | 2/2006 |
| JP | 2008250852 A | 10/2008 |
| JP | 2016200979 | 12/2016 |
| WO | 2009/036988 A1 | 3/2009 |
| WO | 2011/058490 A1 | 5/2011 |

* cited by examiner

SMOKE DETECTORS

This application is a National Phase Filing of PCT/EP2020/074162, having an International filing date of Aug. 28, 2020, which claims priority of Great Britain Patent Application No. 1912448.6, filed Aug. 30, 2019. The disclosure of the foregoing are hereby incorporated by reference.

FIELD OF THE INVENTION

The present invention relates to smoke detectors of the type that depend on the scattering of light by smoke particles and more particularly the invention relates to the design and configuration of an optical arrangement as is provided to facilitate the detection of smoke and to maximize usable space for incorporating various additional components.

BACKGROUND OF THE INVENTION

As those skilled in the art will appreciate many types of smoke detectors work on the principle of detecting when a certain amount of light that is scattered from smoke particles arises in order to thereby signal to people that a fire or other smoke causing event is underway. Such smoked detectors are generally known in the art as 'photoelectric smoke detectors' and they typically comprise a chamber that has the main function of preventing light which has not been scattered by smoke from reaching the sensor. The chamber must allow air and air/smoke to reach the sensor, prevent or strongly reduce significant amounts of light being reflected from the source onto the photo detector when there is no smoke present and continue to prevent these reflections after long term use in dusty environments. Typically the electronic components such as a suitable light source, and a photodetector are mounted on a printed circuit board (PCB) housed inside a cover that envelopes the smoke detector.

FIG. 1 schematically illustrates how a typical photoelectric smoke detector 101 works. Thus, FIG. 1 represents a generalized side view of a typical smoke detector 101 in order to provide an overview of the main components of such a smoke detector. Thus detector 101 comprises a light source 102 and a light sensitive component 103 for detecting (or sensing) light that is scattered from a scattering volume or region 104 (typically a well-defined walled chamber) that is configured to receive contaminant particles such as smoke particles 105. For example, light source 102 may, in a preferred embodiment, comprise a light emitting diode (LED) as emits light such as indicated by ray 106 and the light-sensitive component 103 may, in a preferred embodiment, suitably comprise a photodiode (PD). In addition to the light source 102 and light sensitive component 103 there is also typically provided an obscuration means 107 located in between the light source and the light sensor. Obscuration means 106 may, for example, take the form of a simple planar barrier or a more complex arrangement, the purpose of such a barrier or arrangement being to block direct light from the light source 102 being detected by the light sensor 103. In this way, the aim is therefore for detector 101 to detect only light, such as ray 108 that has been scattered off a medium comprising of contaminant particles such as typically smoke particles 105 in the scattering volume 104. As shown in FIG. 1 scattering of light by smoke may lead to rays emanating in a wide range of directions, for example including back to the light source as shown by backscattered ray 109. The obscuration means 107 is configured to prevent direct light from light source 102 and scattered light derived from internal scattering in the smoke detector device 101 that is not derived from scattering of light by contaminant particles 105 in volume 104 from reaching the light sensitive component 103.

Thus, as illustrated in FIG. 1, light can be either scattered in a forwards direction towards the sensor 103 or in a backwards direction towards the light source 102. This is known in the industry as 'forward scatter' and 'back scatter'. Direct light is typically blocked through a solid structure such as obscuration member 107 that may take the form of a solid body (e.g. a sheet) of opaque material and thus effectively constitute a screen. The light from the light source 102 can be over a range of wavelengths. This wavelength can be tailored to the particular contaminants of interest (e.g. smoke particles) that the smoke detector 101 is configured to detect. The configuration seen in FIG. 1 is the basic set-up of most photoelectric type contaminant detectors.

Photoelectric smoke detectors face a range of issues, the main issues resolving around (i) optical sensitivity, (ii) electromagnetic considerations and (iii) cost/space considerations.

Referring to FIG. 1, typically optical sensitivity issues revolve around the amount of light generated from the LED 102 being far in excess of light from the scattering volume 104 which is received by the light-sensitive component (photodiode) 103. Typically the light received by the photodiode 103 is of the order of $10^{-7}$ of the light leaving the LED 102. As a result, the light-sensitive component 103 is highly sensitive to light reflected from the surfaces of the surrounding smoke chamber and from external light contamination via the air inlet holes as are provided to enable air and therefore air comprising smoke to circulate therein. This high sensitivity often means that the internal chamber in which the smoke and components reside needs large relative dimensions in order to reduce the quiescent background level. Further, chambers have tolerance and longevity issues resultant from dust contamination within the chamber.

As regards electromagnetic considerations, those skilled in the art will understand that due to the small signals received by the light-sensitive component 103, high levels of electronic amplification are required. Typically, the physical length of connections on the light-sensitive component 103 is such that external electromagnetic influences can impact the levels seen by the light-sensitive component 103. Such electromagnetic interference (EMI) is clearly undesirable in smoke detectors because in the matter of detecting smoke it typically causes a loss of accuracy/reliability in detecting/signalling the presence of smoke. Due to the set-up that typical 'traditional' smoke detectors face, Plated-Through Hole (PTH) components are often required. These larger components increase the susceptibility of the system to electronic contamination. Surface Mount Technology (SMT) allows a route to increase this tolerance, as the smaller dimensions of the components means they can be placed physically closer together, thus decreasing the electromagnetic susceptibility. Additionally, those skilled in the art will appreciate that reducing the electromagnetic susceptibility of a product further decreases cost because less complex electronics are required to achieve a stable product.

In relation to the matters of cost and space there are multiple ways to save in photoelectric detection systems. These include the placement cost of components such as the light source (e.g. an LED) 102 and light sensitive component (e.g. a photodiode) 103, the size of components and the chamber size. SMT components are desirable as they can be placed in a fully automated manner rather than requiring a human operative to solder such one or more components onto a printed circuit board (PCB). This results in the reduction in human labour, component space required and increased product quality. Furthermore, smaller chambers are also highly desirable. Smaller smoke chambers mean that smaller surrounding plastics and PCB space are needed, both which add to increased product performance and decreased cost.

UK patent number GB 2404731 B in the name of UK company 'Apollo Fire Detectors Limited' and entitled 'Smoke detector with compact light source' is an example of a scattered-light smoke detector that reduces the effect of reflected light by using a light source with a narrow beam having small divergence. In this regard GB 2404731 B discloses a surface mount device (SMD) comprising a light emitting diode (LED) chip device which produces a narrow light beam having low divergence within a small envelope.

UK patent number GB 2531495 B, also in the name of UK company 'Apollo Fire Detectors Limited' and entitled 'Smoke detector', is a further example of such a scattered-light smoke detector. A 'light trap' is provided to prevent and/or reduce light reflected from the light source and chamber walls being sensed by the photodetector whilst nevertheless allowing light scattered from smoke to be detected. The invention disclosed may be considered an extension to that disclosed in GB2404731 B in that it does not as such impact on the underlying science of how the detector works in terms of the active regions of the light source (LED), light sensor (photodiode) and scattering volume from which light is required to be sensed, instead the additional feature of the light trap being configured to improve upon the matter of preventing light that passes unscattered from the light source from being detected by the sensor.

Both UK patent numbers GB 2404731 B and GB 2531495 B disclose a smoke detector such that the optical processing of light is in relation to light as transmitted by the light source rather than in relation to any resulting scattered light that is required to be detected. Such systems thus comprise optical processing at the 'front end'. In contrast there are systems that comprise optical processing at the back end, i.e. on the detector side. In other words, in contrast to front end systems a 'back end' system comprises optical processing after the scattering volume (104 in FIG. 1 of the present disclosure) from which light scattered from smoke is required to be detected.

UK patent no. GB2236390 A in the name of Matsushita Electric Works Ltd and entitled Photoelectric smoke detector' is an example of a 'back end' system that has the aim of providing an improved detector that effectively reduces the number of constituent parts, lowers manufacturing costs and minimizes size of a smoke detector. This is achieved by (i) the smoke detector comprising a light source in the form of a plated-through-hole LED that is mounted at an angle relative to the circuit substrate coupled with (ii) a light receiving element that comprises a prism section to receive and alter (turn) the direction of received scattered light and a lens section that is configured to focus the light on to a SMT photodiode. Tolerance from stray light is achieved through using physical shielding and not, for example, by virtue of any optical processing as such.

Another example of a 'back end' system is disclosed in Japanese patent application publication no. JP2016200979 A in the name of Japanese company 'Hochiki Co' and entitled 'Smoke detector'. The purpose is to improve efficiency in terms of manufacture of a smoke detector and thereby reduce the overall size. It does this by (i) using a first prismatic element in the form of a parabolic reflector to create a collimated beam of light from a light emitting point, a focus point, of an SMT LED as is mounted on a PCB, (ii) directing the collimated beam of light at a smoke detection space (scattering volume as may comprise smoke that is to be detected) and then (iii) collecting the scattered light by use of a second prismatic element, on the light reception side, that comprises a flat light receiving surface and then providing a parabolic surface to converge and focus the received light onto a focal point at the SMT photodiode as is mounted on the PCB. Each prism bends the light by 90 degrees and the axis of the system is parallel with the PCB. The function of each respective prism may be seen to provide no other function other than the redirection of the light. The surface of the respective prisms on the side adjacent to the smoke detection volume must in each case be flat and thus efficiency is lost from non-linearly incident light on these surfaces being effectively lost as it is evidently not utilized. A disadvantage with the approach disclosed by Hochiki is that two prismatic optical elements are utilized which significantly increases the overall cost of the device as compared with a device, such as that disclosed in GB2236390 A of Matsushita Electric Works Ltd, that uses only a single prismatic optical element.

Although GB2236390 A and JP2016200979 A go some way in terms of providing an improved smoked detector of reduced size and lower cost in terms of manufacture, the efficiency and sensitivity of the devices disclosed is not optimized as such and moreover the usable space on the PCB is also sub-optimal. For example, the disclosure JP2016200979 A of Hochiki, is such that the use of two prisms (optical elements) renders valuable PCB space as unusable and it also puts 5 the smoke detection region relatively close to the PCB and, as noted above, effectively costs more than a system that uses only one such optical element. Similarly, the smoke detector disclosed in GB2236390 A is such that the design comprises positioning the LED at one side of the housing and the light receiving element that comprises a prism at the other side with the smoke sensitive scattering region extending there-between in a manner thereby rendering much of the circuit substrate as unusable.

Increasingly, for safety reasons and for purposes of reducing costs of safety sensors/detectors, the public and industry are requiring a safety sensor/detector to also comprise one or more additional functional components such as, for example, a carbon monoxide (CO) sensor, a sounding device enabling an audible sound signal to be generated upon a given unit detecting smoke or carbon monoxide gas and a visual alarm device (VAD) for generating a visual signal to alert a person to the presence of detected fire or CO gas. Releasing space on a PCB for use in incorporating one or more additional electronic components in a smoke detector unit at as low a cost as possible is thus generally desirable. In addition there is a need for a photoelectric type smoke detector that provides enhanced functionality, such as, notably differentiation of various types of smoke because such would, for example, provide further potentially important information in identifying the source of the smoke detected.

In view of the aforesaid problems there is thus a general need to provide an improved smoke detector unit that is constructed at low cost using solely SMT components and that minimizes usage of PCB space in order to thereby allow additional components and sensors and the like to be incorporated on the PCB whilst keeping the overall size of the smoke detector unit suitably constrained.

SUMMARY OF THE INVENTION

An object of the present invention is to provide an improved smoke detector of the type that depends on the scattering of light by smoke particles.

Another object of the present invention is to provide a smoke detector of the type that depends on the scattering of light by smoke particles comprising an improved optical arrangement that optimizes the available space on a PCB for incorporating various additional desirable components.

Another object of the present invention is to decrease the electromagnetic susceptibility of a smoke detector of the type that depends on the scattering of light by smoke particles.

Another object of the present invention is thus to provide a smoke detector of the type that depends on the scattering of light by smoke particles that can be manufactured solely from SMT components without having to incorporate a PTH component.

Another object of the present invention is to provide an improved smoke detector of the type that depends on the scattering of light by smoke particles such that enhanced functionality, such as differentiation of types of smoke, is provided as compared with known smoke detectors.

Another object of the present invention is thus to reduce the overall costs associated with the manufacture of a smoke detector.

According to a first aspect of the present invention there is provided a smoke detector of the type that depends on the scattering of light by smoke particles comprising:

a chamber configured to receive smoke particles from an environment in which said smoke detector is required to detect smoke;

a source of light configured to project light therefrom such that light that is received by said chamber is scattered by said smoke particles;

an optical element having a light receiving surface in the form of an objective lens configured to receive light scattered by said smoke particles, said optical element associated with an optical axis defined as 0° being normal to the surface of said lens; and said optical element, upon receiving said scattered light, configured to selectively differentiate between required scattered light that is derived from a subset of predefined directions with respect to the angle of incidence upon said optical element and scattered light that is derived from other directions in order to thereby filter out the light that is not required and thereby redirect said required scattered light onto a photodetector that is configured to detect at least some of said received scattered light;

said smoke detector characterized in that:

said optical element (207) comprises a prism to provide said differentiation, said prism having a primary surface (212), a secondary surface (213) and a tertiary surface (214, 215), said prism thereby configured to substantially transmit received light to said photodetector (208) for a range of angles of incidence relative to said optical axis of up to ±25° and substantially reject incident light that is received from angles of incidence outside of said range ±25°.

Preferably, said objective lens is a non-classical optical lens specifically configured to provide non-linear functionality as regards transmission of light.

Preferably, said prism substantially transmits received light to said photodetector for angles of incidence relative to said optical axis up to approximately ±20° and substantially rejects incident light that is received from angles of incidence outside of said range.

Preferably, said primary surface angled at 30° to 50° relative to said optical axis to provide said differentiation between said predefined sub-set of angles of said scattered light that are required to be detected from those that are not.

Preferably, said secondary prism surface is angled at 30° to 50° relative to said primary prism surface.

Preferably, said secondary prism surface is angled at approximately 41° relative to said primary prism surface.

Preferably said optical element is configured to concentrate said differentiated required light.

Preferably, said optical element comprises a lens to direct and focus said differentiated required light on to said photodetector.

Preferably, said light source comprises a light emitting diode (LED).

Preferably, said photodetector comprises a photodiode.

Preferably, said optical element comprises an elongate body having a bend in the form of a dog leg.

Preferably, said optical element is made of a material that is substantially optically transparent to at least the visible part of the electromagnetic spectrum.

Preferably said optical element is made of a polycarbonate.

Preferably said optical element is made of acrylic or glass.

Preferably, in addition to a said first optical element, there is provided a second optical element configured to receive light as has been scattered by said smoke particles, said second optical element rotationally offset from said first optical element such that said first and second optical elements each respectively act to provide an independent mode of detection.

BRIEF DESCRIPTION OF THE DRAWINGS

For a better understanding of the invention and to show how the same may be carried into effect, there will now be described by way of example only, specific embodiments, methods and processes according to the present invention with reference to the accompanying drawings in which:

FIG. 12b schematically illustrates a perspective view of the complete smoke detector unit of FIG. 12a;

DETAILED DESCRIPTION OF THE PREFERRED EMBODIMENTS

There will now be described by way of example a specific mode contemplated by the inventors. In the following description, numerous specific details are set forth in order to provide a thorough understanding. It will be apparent however, to one skilled in the art, that the present invention may be practiced without limitation to these specific details. In other instances, well known methods and structures have not been described in detail so as not to unnecessarily obscure the description.

In the present disclosure and notably in terms of the claims appended hereto the meaning of the term 'light' is to be construed broadly as comprising any electromagnetic (EM) radiation from and including the infrared (IR) part of the electromagnetic spectrum up to and including at least the ultraviolet (UV) part of the electromagnetic spectrum. The reason for this is that the present invention as comprises a smoke detector has been determined by the inventors to work (a) with light (as per its normal meaning vis-à-vis the visible part of the EM spectrum), and (b) also with any other wavelengths of EM radiation from and including the IR to the UV. Thus any reference to 'light' in the present description and in the appended claim is to be construed accordingly as the entire range from UV to IR inclusive. Similarly, as well as the invention working with unpolarized light it also works with polarized light and thus the term 'light' as used herein is to be construed as covering both polarized light and unpolarized light.

Figure 1:
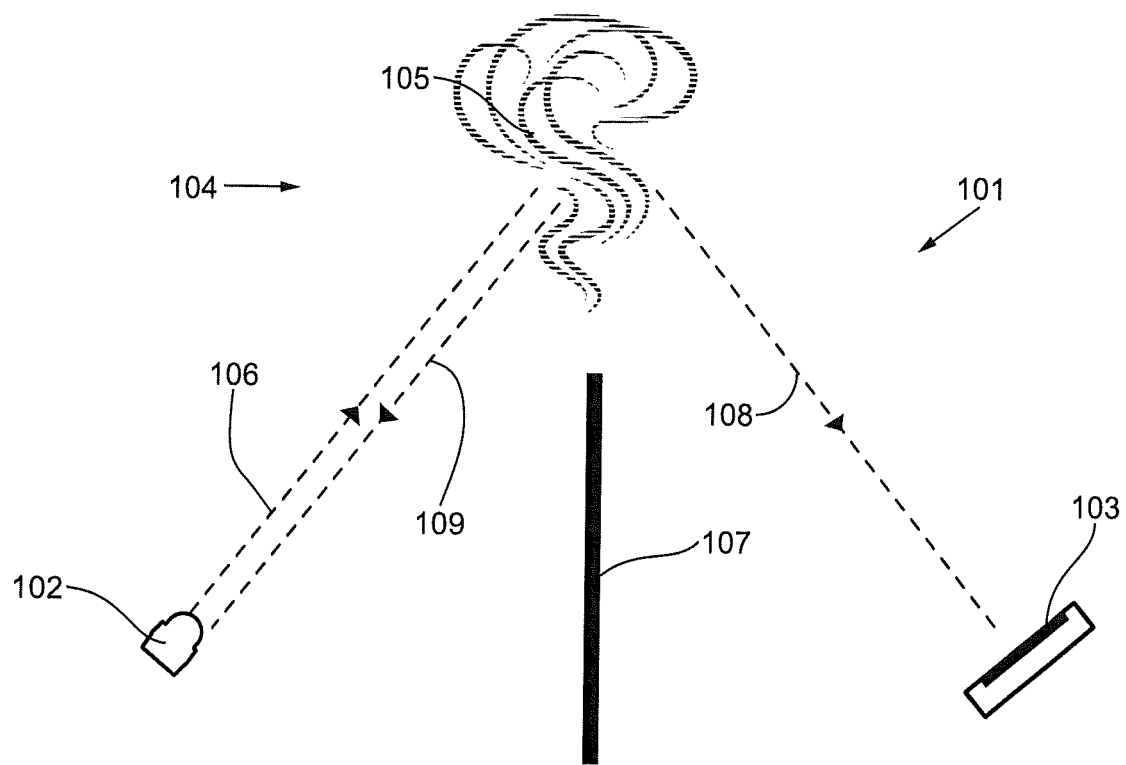
FIG. 1 schematically illustrates a prior art photoelectric smoke detector layout having a light source, a light sensitive component and an obscuration means between the light source and the light sensitive component.
Figure 2:
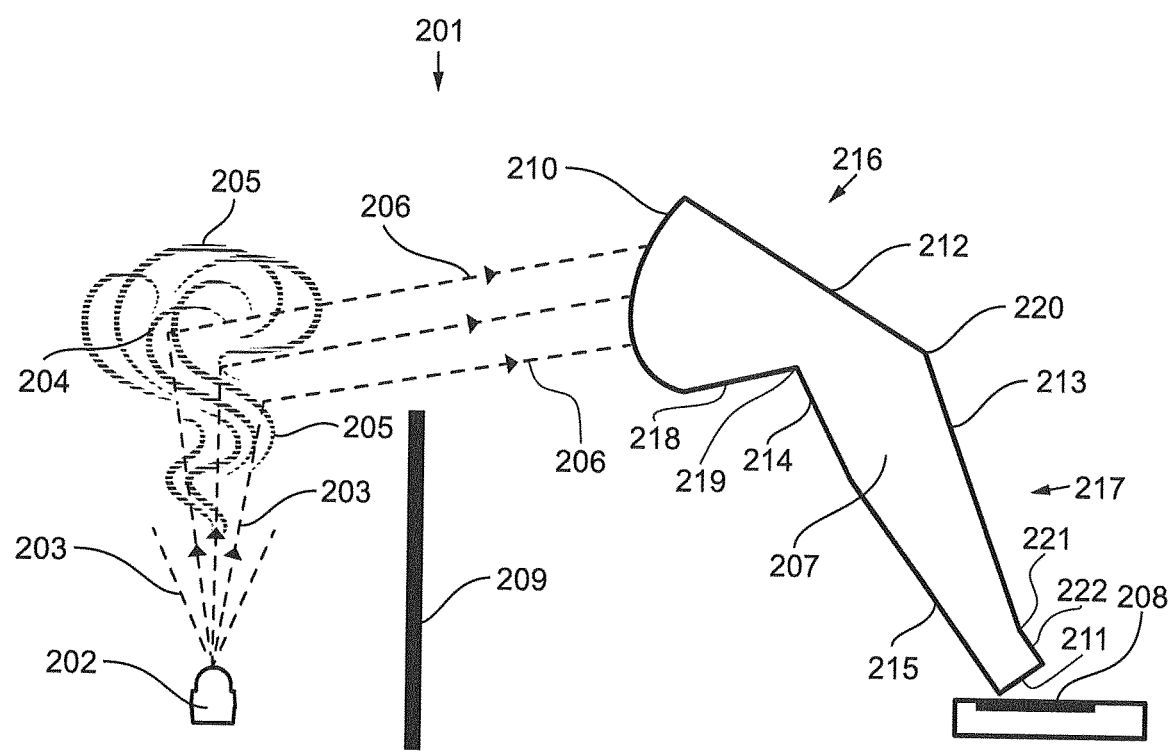
FIG. 2 schematically illustrates, in the form of a generalized side elevation view, an overview of the main components of a smoke detector as configured in accordance with the present invention.

FIG. 2 schematically illustrates, in the form of a generalized side elevation view, an overview of the main components of an exemplary smoke detector apparatus 201 as configured in accordance with the present invention. A smoke detector apparatus configured in this manner operates in an evolved or 'active' manner as compared to a smoke detector operating in accordance with the standard prior art method discussed earlier in relation to FIG. 1. It performs this, using a light source 202 as may suitably comprise an LED, which directs light 203 towards a scatter volume 204, which in the example shown is substantially vertically above the light source 202. Scatter volume 204 is the 'sensitive region' that is configured to receive air from the surrounding environment in which there may be smoke, as comprises smoke particles, 205. If smoke 205, is present then the smoke particles scatter light such that some of the resulting scattered light 206 is directed towards a specially configured optical element (light collection device) 207 that is, in accordance with the present invention, configured to collect and process the received scattered light in a required manner. Notably, optical element 207 is configured to receive light as has been scattered by said smoke particles and concentrate some thereof that is required in order to thereby enable the resultant concentrated light to be redirected to an appropriately configured and positioned photosensitive element 208. More particularly, in accordance with the present invention, optical element 207 is configured to selectively differentiate between required scattered light that is derived from a subset of predefined directions with respect to the angle of incidence upon said optical element and scattered light that is derived from other directions in order to thereby filter out the light that is not required and thus concentrate, focus and direct the required scattered light onto an appropriately positioned photosensitive element 208 as may suitably comprise a photodiode (PD). In common with the prior art system shown in FIG. 1 an obscuration means 209 located between the light source 202 and photosensitive element 208 is required and in FIG. 2 this is shown in simplified form as a panel in cross section, but in practice takes a more complex configuration as will be described hereinafter.

As shown in FIG. 2, optical element 207 is, in the best mode contemplated, generally elongate with, in side elevational view, a dog-leg type configuration. More specifically, optical element 207 comprises a main body that functions as a prism and which thus comprises a refracting medium bounded by intersecting plane surfaces. The primary purpose of optical element 207 is to receive scattered light 206 and then redirect the required scattered light that is received to the photosensitive element 208 whilst also filtering out scattered light that is received, but which is not required, so that such unrequired light is not detected by the photosensitive element 208. Thus optical element 207 comprises a specially configured light receiving surface (lens) 210 for receiving scattered light from the scattering volume and a further specially configured surface (preferably a lens) 211 at the other end of device 207 for enabling the resultant required light to be optimally transmitted from optical element 207 to the photosensitive element 208. In this way those skilled in the art will appreciate that optical element 207, in broad terms thus effectively comprises two surfaces with a prism there-between. Those respective surfaces may, in a preferred embodiment, be considered to function as lenses which are preferably 'non-linear' meaning that they do not have a constant radius of curvature because they are of a more irregular shape due to the desired cut-off of light from angles outside a certain range of incident angles upon the light receiving surface 210. Nevertheless the exemplary preferred light receiving surface 210 is, as shown in FIG. 2, curved in side elevational view. In FIG. 2 the light transmission lens 211 as is present at the photodiode end of optical element 207 is shown as a flat rather than a curved surface, but it is to be understood that the specific lens used may be associated with a curved surface because it's exact configuration may be such as to direct the collected and received light and preferably also concentrate the light that is required to be detected as is desired for a particular application of a smoke detector.

In order to achieve the required differentiation between required scattered light that is derived from required incident angles from unrequired scattered light that is derived from other incident angles, optical element 207 comprises at least one surface, but preferably a plurality of surfaces, to process the incoming scattered light that is received via first surface region 210. In the best mode contemplated, light receiving surface 210 is positioned towards the upper part of the smoke detector and the terminal light transmission surface 211 through which light is directed to photosensitive element 208 is positioned at or substantially at the opposite end of the body of the optical element.

In the best mode contemplated, light receiving surface 210 comprises an objective lens that is non-classical (non-linear) in terms of its optical characteristics and which is convex in terms of it general curvature. Moreover surface 210 is such that it has a non-regular curved geometrical shape which is non-linear in terms of its optical characteristics. The required redirection of light received through receiving surface 210 is, in accordance with the present invention, realised through the received light being directed at one or a series of prism surfaces 212, 213, 214 and 215 as form boundary walls of optical element 207 and which each respectively act to differentiate between required and unrequired angles of the received light 206. In contrast, light transmission surface or lens 211 as is located at the opposite end of optical element 207 may take various forms in order to transmit and preferably concentrate the resultant light received by it. In the FIG. 2 the surface 211 is merely shown as planar, but in practice may be configured to focus the light transmitted there-through onto the photodetector 208.

The key or primary prism surfaces are those respectively labelled surfaces 212 and 213 that are located on the rearward side of optical element 207 with respect to the light receiving side as comprises light receiving surface 210. Surface 212 is the first primary prism surface located substantially directly behind light receiving surface 210. Surface 213 forms the lower back (or rear) portion of optical element 207 and is referred to hereafter as the second primary prism surface. These respective first and second primary prism surfaces are located and configured to direct light to the opposite end of the optical element 207 as comprises light transmission surface 211 which, in the best mode, comprises a focusing lens that focusses the resultant transmitted light onto the photodetector 208.

In the best mode contemplated optical element 207 comprises a series of further prism surfaces in addition to the respective first and second primary prism surfaces 212 and 213, these being labelled on FIG. 2 as respective secondary prism surface 214 and tertiary prism surface 215. Secondary prism surface 214 is located above (higher up optical element 207) as compared with tertiary surface 215. Secondary surface 214 is thus disposed substantially diametrically opposite the point of intersection of primary prism surfaces 212 and 213 whereas tertiary prism surface 215 is disposed substantially opposite the lower primary prism surface 213. In this way, the additional prism surfaces 214 and 215 are effectively configured to yet further maximize the amount of the received scattered light that is required from that which is not, the required light being that received by receiving surface 210 from a predetermined range of incoming angles that are known from prior experiment to be required as opposed to scattered light from other incoming angles that is not required.

As already discussed above the general shape of optical element 207 is, in side elevational view, that of a dog-leg, by which it is meant that the main body of 207 effectively bends sharply such that it may thus be seen to comprise two main regions, respectively an upper region generally indicated by arrow 216 and lower region as is generally indicated by arrow 217. Thus light receiving surface 210 at the front of the device as receives incident light is bounded on its upper side by primary prism surface 212 and is bounded on its opposite (lower) side by surface 218 and effectively constitutes upper region 216. Lower surface 218 extends away from light receiving surface 210 until it terminates at point 219 which constitutes the point about which the main body of optical element 207 substantially changes direction. Thus at point 219 the main body of optical element generally changes direction from a substantially horizontal disposition (vis-a-vis extending from lens 210 to primary prism surface 212) to a generally substantially vertical disposition which on the front side of the device extends downwards from the uppermost point 219 via respective additional surfaces 214, 215 to the lowest point which is associated with the light transmission lens 211. The rear side of the optical element correspondingly changes direction in terms of its overall shape and this arises at the point of intersection 220 of the respective primary prism surfaces 212, 213 as are located on the rear side of the device. Thus, from point 220, the rear side of the device comprises the lower primary prism surface 213 as terminates, in the example, at a point 221 and thereafter, towards the lens 211, the outer surface of optical element 207 continues as a relatively short face 222 that is, in the example, substantially parallel to the plane of the corresponding face 215 on the front side of the device.

The particular shape arrived at for optical element 207 depends on the requirements of the smoke detector being constructed. Such an optical element may be made by experimenting through simulation (and/or with some real world physical experimentation) with different shapes of optical element and materials having different refractive indices to then arrive at an optimum configuration for receiving and then optimally differentiating (filtering) between required and unrequired received light. Suitable software as utilises numerical algorithms such as Monte Carlo techniques or Finite Element methods for designing such optical components is well known to those skilled in the art. In the best mode as used by the present inventors the software is that of 'OpticStudio'® sold by Zemax LLC (address: 10230 NE Points Drive, Suite 500, Kirkland, Washington, 98033, USA; website: www.Zemax.com). Use of this software in relation to the optical element 207 as made of a polycarbonate led to the best mode shape contemplated of the elongate optical element comprising a dog-leg shape.

Optical element 207 is made of a suitable optically transparent material such as, in the best mode contemplated, a polycarbonate. This is low cost material that is found to have optimum properties such as refractive index, hardness, ease of moulding and the like. Alternative materials could be used such as, for example, acrylic or, albeit expensive, glass. The following discussion concerns the best mode material of polycarbonate, but if other materials are used then those skilled in the art will appreciate that the refractive index will change with resultant consequences as regards the precise angular relationships that will provide an optimum smoke detector that use a given material. Those angular relationships as are critical in order to provide an optimised smoke detector in accordance with the present invention are thus material dependent and are required to be determined using computer simulation coupled with appropriate experimentation for a given material under consideration.

The basic setup as is schematically illustrated in FIG. 2 allows, though is not limited to, dual SMT components i.e. a SMT light source 202 and a SMT photosensitive element 208. Those skilled in the art will appreciate that the basic setup depicted in FIG. 2 and the aims and benefits thereof could potentially be achieved through use of a basic prismatic structure, however, such a basic system would fail to achieve/satisfy many of the further aims and desired benefits that are provided by the present invention, notably to (i) decrease the chamber size and (ii) increase the tolerance of the system. These further aims and desired benefits become a serious requirement as the scale of the system (desirable further miniaturisation) decreases. The basic setup of the present invention depicted in FIG. 2 uniquely achieves the use of dual SMT components (202 and 208), a single optical element 207 and places the scatter volume 204 to sit vertically above the light source (LED) 202. The unique benefit of this approach as compared with the prior art discussed earlier is that it moves the active 'smoke sensing' region above the LED 202, increasing the available space on a PCB (to which light source 202 and photosensitive element 208 are mounted) that may thus be used to accommodate various other desirable devices (e.g. a carbon monoxide (CO) sensor), in addition to a smoke detector per se, as are desirable to be deployed within the housing of a smoke detector unit.

Figure 3:
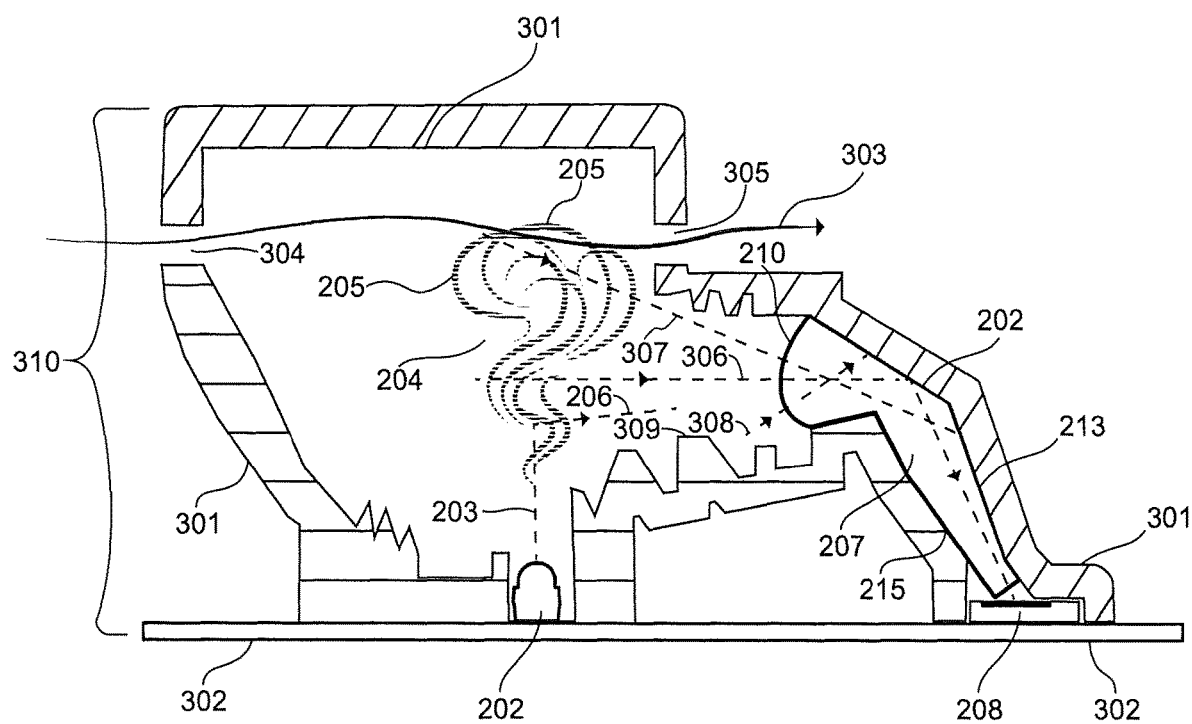
FIG. 3 schematically illustrates a side elevation view of a substantially complete smoke detector of the type depicted in FIG. 2 that is thus in-situ in a housing as forms a walled chamber that defines a scattering volume for smoke to enter.

FIG. 3 schematically illustrates a side elevation view of a substantially complete smoke detector apparatus of the type 201 depicted in FIG. 2, but that is in-situ in a housing 301 as forms a walled chamber that defines a scattering volume for smoke to enter. Housing 301 may comprise any suitable material such as for example a plastics material. Thus the smoke detector elements depicted in FIG. 2 are located within a housing 301 as is affixed to a PCB 302. Light source 202 and photosensitive element 208 are shown attached to the PCB 302. Housing 301 in combination with the PCB 302 as is dispose lower down substantially envelops light source 202, optical element 207, photosensitive element 208 and obscuration 209.

In FIG. 3 airflow into and out of the housing 301 of the smoke detector is shown as arrow 303 towards the top of the detector unit which passes through air inlet/outlet orifice structures 304 to the left of the figure and 305 to the right which form the terminal points of a passage or duct (as may form a part of an array of such passages) that extends there-between and which is configured to allow and direct air to enter the sensitive region 204 of the chamber. Those skilled in the art will appreciate that respective air inlet structures 304, 305 may be discrete orifices of which there may be many circumventing the smoke detector unit or an air inlet structure may merely comprise an opening in the casing of the smoke detector that substantially subtends a part of or the entire circumference/perimeter of the smoke detector unit in order to provide required optimum unimpeded airflow.

A key component of the present invention is that it actively angularly filters the light that is received by light receiving surface 210 in such a way as to allow miniaturization and optimization of the overall system. This is achieved through optically rejecting unwanted 'off-angle' light that enters the system.

The system illustrated in FIG. 3 relies on the optics performing more than a simple re-direction of light. The optical element 207 performs active rejection of unwanted 'off-angle' stray light. It does so in a manner beyond considering rays, but by considering planar inputs. The consideration of planar inputs is of significant importance in terms of understanding the present invention. The invention provides the ability to greatly increase both the proportion of desired light that is received, while simultaneously allowing for increased tolerance in respect of any undesired 'off-angle' light that is received. For convenience, the depicted ray 306, is parallel to the main plane of the PCB and, in the example shown, also represents the optical axis '306' of the system. Thus, the system allows for and is substantially tolerant with respect to planar rays striking the majority of the light receiving surface 210, rather than it being more constrained to receiving such light at a much smaller specific point in the system. Thus, the amount of optical light captured increases with such considerations, with consequent further increases in tolerance in the design to undesirable stray light such as, for example, those depicted as light rays 307 and 308. In FIG. 3, importantly ray 306 as is parallel to the main plane of the PCB in FIG. 3 may, also be considered to define the optical axis of the system depicted. The obscuration of FIG. 2 is shown in FIG. 3 as a more complicated and multifaceted structure 309 that is optimized to prevent unwanted light from reaching surface 210 of optical element 207.

In terms of the overall dimensions of the device depicted in FIGS. 2 and FIG. 3, the actual physical size of chamber 310 is approximately 25 mm in height and 42 mm in length (from left to right across the page). The optical element 207 is relatively tiny. The width (depth into the page) of the optical element depicted is approximately 5 mm and the approximate dimensions of the side elevations of FIGS. 2 and 3 as shown are as follows:

curved light receiving surface 210: 5 mm from top to bottom
lower underneath surface 218: 3.5 mm
lower front surface 214: 3.75 mm
lower front surface 215: 6 mm
primary upper prism (rear) surface 212: 8 mm
primary lower prism (rear) surface 213: 7 mm The angles of the respective surfaces relative to one another, including the key or primary prism surfaces 212 and 213 of optical element 207 allows the design of a smoke detector in accordance with the present invention to be tailored to enable the selection of an optimum viewing angle which thereby enables an optimum amount of required light to be collected and thus detected.

Figure 4:
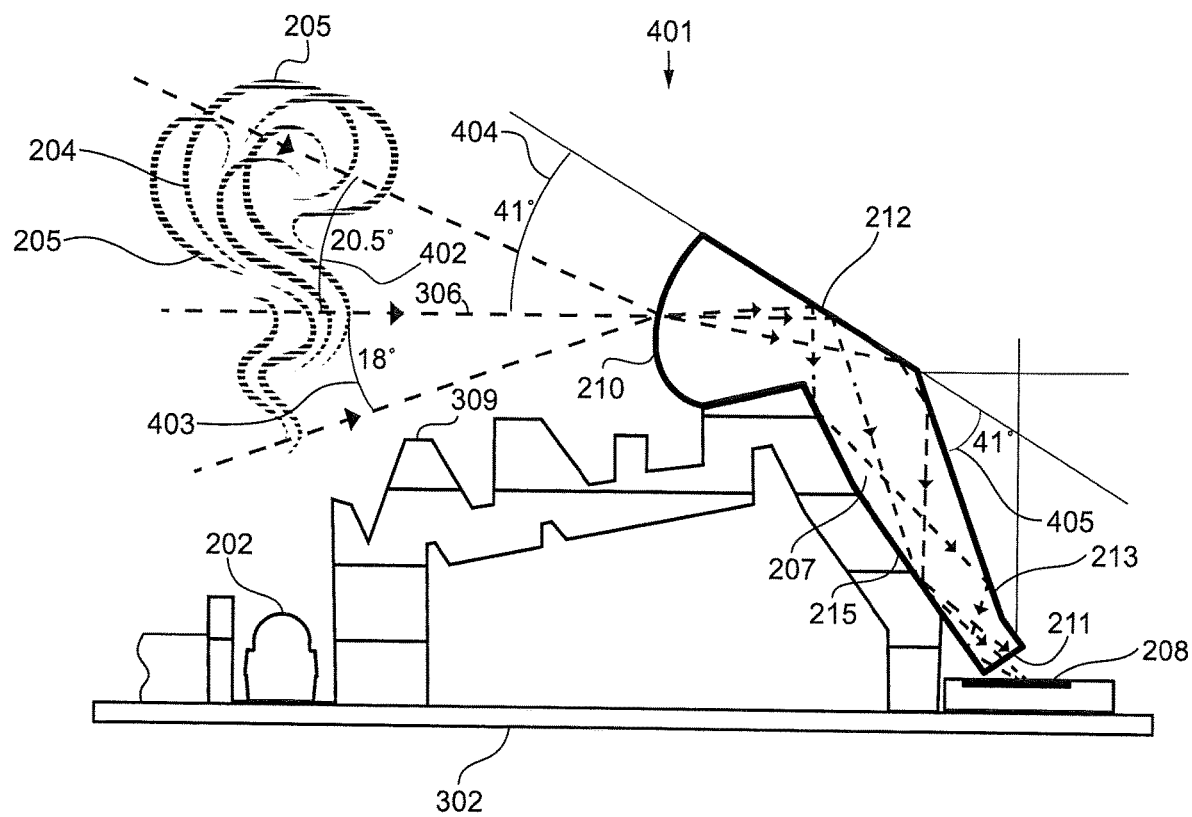
FIG. 4 schematically illustrates, in side elevation view, the best mode contemplated of the invention in terms of the angular selectivity for detected light rays as scattered off smoke particles present in the scattering volume of FIGS. 2 and 3.

FIG. 4 thereby schematically illustrates, in side elevation view, the best mode contemplated of the invention in terms of the angular selectivity for detected light rays as scattered off smoke particles present in the scattering volume of FIGS. 2 and 3. The best mode design 401 depicted in FIG. 4 is such that the device comprises an optical element 207 made of polycarbonate that, from simulation and experiment using the Zemax® software, leads to a half angle, that is substantially tolerant to both stray rays and planar inputs of light, of approximately ±20°. The apparatus of FIG. 4 is designed in such a way as to deliberately create this half angle as is particular to the material of which the optical element is made. In the figure the precise angles for the example shown are 20.5° for the upper half angle 402 and 18° for the lower half angle 403 which in terms of the figure are each disposed on opposite sides of central ray 306 as is shown horizontal and thus parallel to the main plane of the PCB 302.

As indicated above ray line 306 can be considered to represent the optical axis that is the centre of the optics. Thus, hereinafter the horizontal line in FIG. 4 that has been referred to previously as 'ray 306' is, as appropriate hereinafter, also referred to as the optical axis 306. The exact meaning is better explained in terms of the transmission coefficient through optical element as it varies with the angle of incidence of incoming light rays relative to the normal, 90° being the angle of incidence of a ray along the optical axis 306. The reference to the 'optical axis' 306 of the system and the meaning and definition thereof is thus discussed subsequently in relation to FIGS. 8a and 8b.

The key angle in this system is the angular relationship as between the respective primary prism surfaces 212 and 213. In the case of the example of FIG. 4, the primary angle 404 as subtends a portion of light receiving surface 210 up to its top surface 212 is shown to be 41° such that the first primary prism surface 212 is at an angle of approximately 41° relative to the horizontal that is depicted by ray 306. This same angular separation is used for the a corresponding secondary angle 405 for the second primary prism surface 213 relative to surface 212 and thus in the example shown respective angles 404 and 405 are respectively each 41°. Nevertheless, this angular separation is dynamic (i.e. flexible) such that changing the angular relationship as between respective surfaces 212 and 213 thereby allows the system to be tailored to specific purposes.

Figure 5:
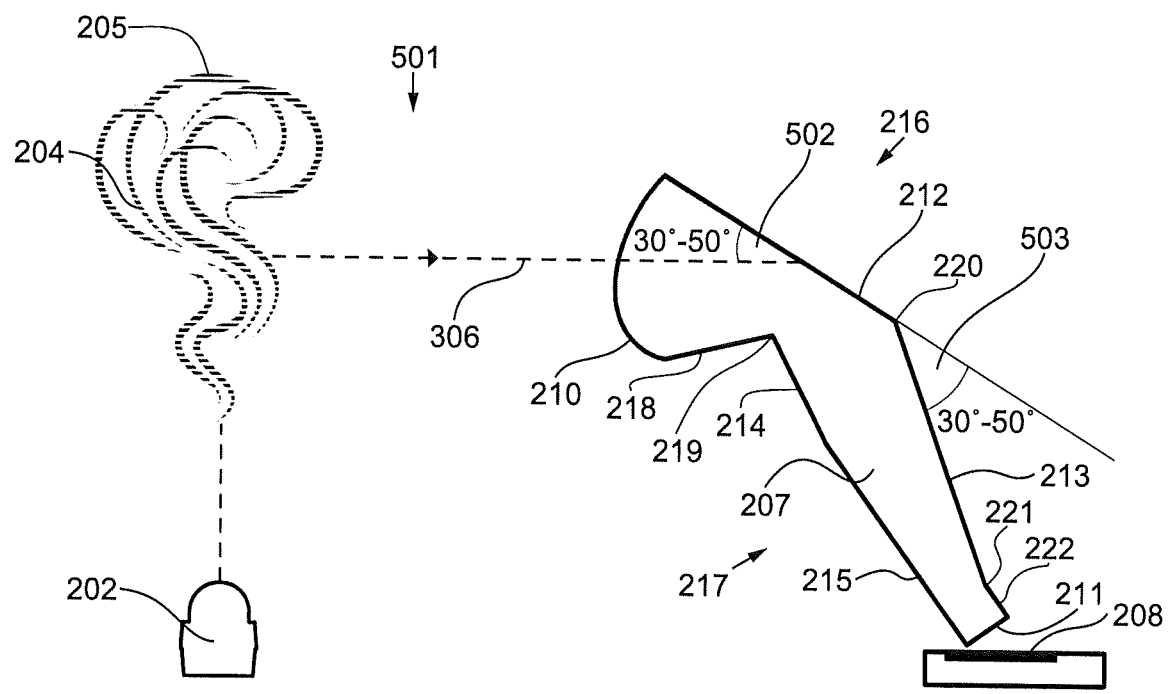
FIG. 5 schematically illustrates in further detail, in side elevation view, the preferred ranges of the key optical angles in the smoke detector as described in FIG. 4.

The system further allows for planar entry of direct light. This means that the system retains some flexibility for off-centre light hitting the primary optical light receiving surface 210. In order to better explain how this desired flexibility is achieved, FIG. 5 schematically illustrates a stripped down version 501 of the apparatus of FIG. 4. Thus, only the most relevant corresponding elements of the apparatus shown in FIG. 4 are shown in FIG. 5. In FIG. 5 light, such as that depicted by ray 306 as is scattered off smoke 205, is received by and thus collected by optical element 207 as is housed in a chamber of the type discussed in relation to FIG. 3 and because this received light is received from a desired angle that is required to be sensed by sensor 208, is such that it is then transmitted to the photo sensitive element 208. The optical element or collection device 207 behaves in such a manner as to be selective of the light captured. The light receiving surface 210 is configured as a primary (objective) lens that works/functions to capture the required light, such as ray 306, in a manner such that the light is transmitted onto the respective primary prism surfaces 212, 213 of optical element 207. The respective first and second primary prism surfaces 212, 213 work collectively in such a manner as to angularly filter the incoming light so as to effectively discard unwanted light from the system whilst permitting required light to reach the light transmission surface 211 and hence photosensitive element 208.

The combination of the objective lens 210 and respective first and second prism surfaces 212 and 213 is such that optical element 207 substantially only allows light from a desired range of angles to be detected by sensor 208. Thus, light outside of the desired acceptance angle range is effectively rejected by the processing that is performed by optical element 207. The desired rejection/acceptance angles can be tuned using the ratio of the two principal optical prism surface 212 and 213, coupled against the objective lens 210 and the desired principle incoming angle as is represented in the figure by horizontal ray 306. Further optimisation can be achieved if the primary optical surface 210 becomes asymmetric. This combination allows for a tighter acceptance angle from the incoming light, thereby increasing the rejection of undesirable light.

Light-traps can be further added to increase rejection of undesirable light when placed behind, and/or are otherwise appropriately positioned, with respect to the reflective first and second prism surfaces 212 and 213.

As those skilled in the art will appreciate, the lower or under surface 218 of optical element 207 may be made in such a manner as to allow for the inclusion of features for aligning the overall structure of the optical element. This is made possible by tailoring primary optical surface 210 accordingly.

As already indicated above, the design of the apparatus as per FIG. 4 is concerned with two key angles, 404 and 405, which are respectively each 41°, but which in practice do not necessarily have to be identical. However, more generally, a range of angles exist for which the invention performs satisfactorily. The particular angle is dependent on the particular material selected for the body of optical element 207. FIG. 5 schematically illustrates in further detail, in side elevation view 501, the preferred ranges of the key optical angles 404 and 405 in the smoke detector as described in FIG. 4. Thus, the primary angle 404 of FIG. 4 is indicated at 502 as an approximate range of angles 30° to 50° inclusive that subtend from upper surface 212 to optical axis 306 and the secondary angle 503 as constitutes the relative angular separation between surface 212 and lower reflective surface 213 is also suitably a range of angles from 30° to 50° inclusive. The first or primary angle 502 is essential to the working of the system, while the secondary angle 503 allows for a notable increase in the refinement of rejection. A system of the type depicted thus works to a satisfactory level over the range 30°-50° for both primary angle 502 and secondary angle 503. Furthermore, the inventors have ascertained that the design of a light acceptance/rejection system in this manner is advantageous in that the overall optical setup can effectively treat/process planar incident light, meaning that it is not dependent on light hitting the centre of the lens 210. Although in the best mode described as per FIG. 4 primary angle 502 and secondary angle 503 are both 41° they may in practice be different, but each nevertheless being in the range 30°-50°. A given system may be tailored to particular requirements such that the actual angles used provided optimised performance. Thus, by altering angles 502 and 503 as my range from 30°- to 50° the half angles shown in FIG. 4 as respective angles 404 and 405 effectively change accordingly such that a half angle of ±20° is preferred, but wherein a half angle of up to ±25° may find satisfactory for a required degree of performance.

Figure 6:
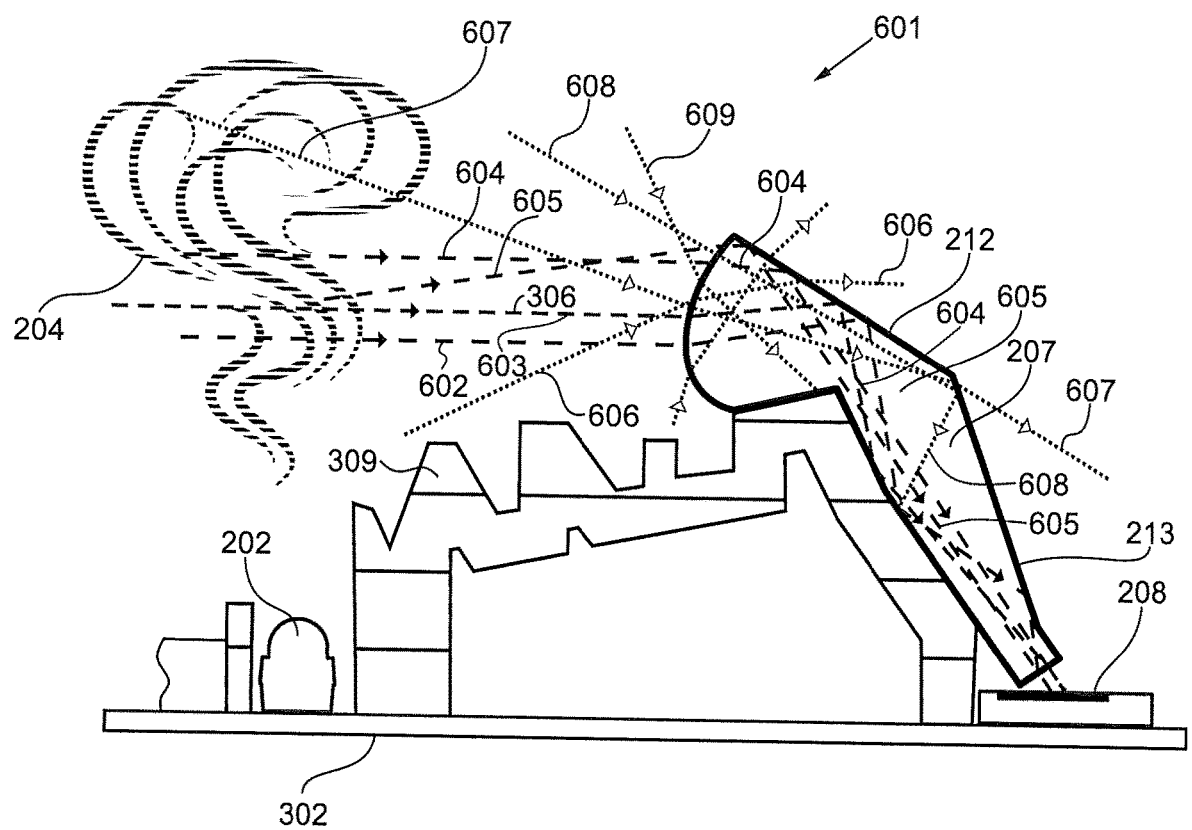
FIG. 6 schematically illustrates in side elevation and in accordance with the present invention as described in relation to respective FIGS. 4 and 5, the optical rejection of incoming light rays as arrive from off-axis angles.

FIG. 6 schematically illustrates in side elevation and in accordance with the present invention as described in relation to respective FIGS. 4 and 5, the optical rejection of incoming light rays as arrive from off-axis angles. Thus, FIG. 6 shows a system 601 in a workable format showing the working optical rejection of light from unrequired off-axis angles, wherein the respective front and rear angles 502 and 503 of FIG. 5 are, as per the best mode of FIG. 4, both 41°. A plurality of incoming scattered light rays 602, 603, 604 and 605 that are required to be detected are shown incoming and incident on receiving surface 210 of optical element 207. Thus, ray 602 is shown as substantially horizontal in the figure and thus below, but parallel to ray 603. In this example ray 603 is such that it is directed along the optical axis 306. Similarly rays 604 and 605 are shown above the optical axis 603, ray 604 being substantially parallel to the optical axis and, in contrast thereto, ray 605 transverse to the optical axis and thus coming in from an angle such that it passes through the optical axis 306 before it reaches the receiving surface 210 of optical element 207. In this way respective rays 602 to 605, being from angles that are required to be detected, are received by optical element 207 such that its primary first and second respective prism surfaces 212, 213 ensure that the received light is transmitted as shown by the respectively corresponding hatched lines on the drawing through optical element 207 to sensor 208. However light rays that are 'off-angle' i.e. received outside the 41° acceptance angle, such as respective rays 606 to 609 are effectively processed such that they are discarded from the system without reaching sensor 208. Thus ray 606 is shown coming in at a relatively sharp angle (i.e. outside the acceptance angle) from below optical axis 306 and respective rays 607 to 609 are similarly depicted as coming in at relatively sharp angles (i.e. outside the acceptance angle) from above optical axis 306.

The performance of a smoke detector, as configured in accordance with the present invention, in its ability to reject unwanted scattered light rays may be improved further. This is achieved by the inclusion of secondary and tertiary rejections rather than purely relying on primary rejection of light rays by way of respective first and second primary prism surfaces 212 and 213. Thus, although an optical system such as the generalised system described in relation to FIG. 5 is workable, such a system may be improved through the inclusion of secondary and tertiary reflection considerations. What this implies is that the system is designed assuming that what should be a rejected ray, under Snell's law, is in-fact retained within the optical element 207, thereby providing a further level of tolerance in the system. Further, these considerations allow for further tolerance to imperfections in the respective first and second primary surfaces 212 and 213. Through tuning the further optical surfaces of optical element 207, then it is possible to increase the magnitude of rejection of unwanted light considerably.

Figure 7:
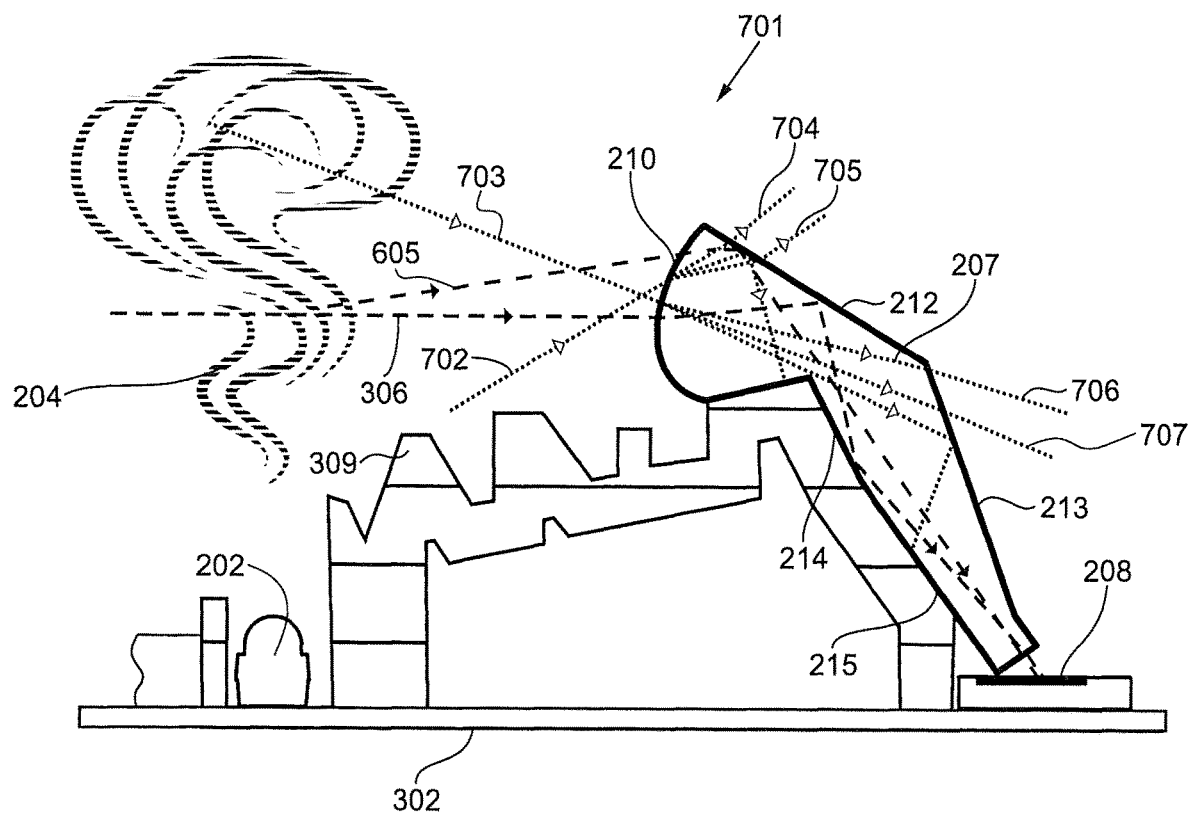
FIG. 7 further details, in side elevation view and in a more simplified form, a couple of specific examples of rejection of off-axis light rays of the type typified in FIG. 6, that are required to be discarded and thus not transmitted to the light sensitive element, this configuration comprising multiple rejections of a light ray through specifically oriented secondary and tertiary reflective surfaces.

FIG. 7 further details, in side elevation view and in a more simplified form, a couple of specific examples of rejection of off-axis light rays of the type typified in FIG. 6, that are required to be discarded and thus not transmitted to the light sensitive element, this configuration comprising multiple rejections of a light ray through specifically oriented secondary and tertiary reflective surfaces. Thus, FIG. 7 shows a system 701 that is designed to considerably increase the magnitude of rejection of unwanted light. Thus, undesired scattered light ray 702 as travels up from below the optical axis 306 to receiving lens 210 and undesired scattered light ray 703 as travels downwards and is received by receiving lens 210 above the optical axis are both such that they are rejected and thus not transmitted through to sensor 208. The precise configuration of optical element 207 is such that it comprises the secondary and tertiary prism surfaces 214 and 215 that facilitate the matter of ensuring that undesired light has multiple chances for rejection from the system, allowing the design to further increase the rejection of unwanted light such as that shown as outward rays 704 an 705 from first primary prism surface 212 and outwardly transmitted rays 706 and 707 from second primary prism surface 213.

Figure 8A:
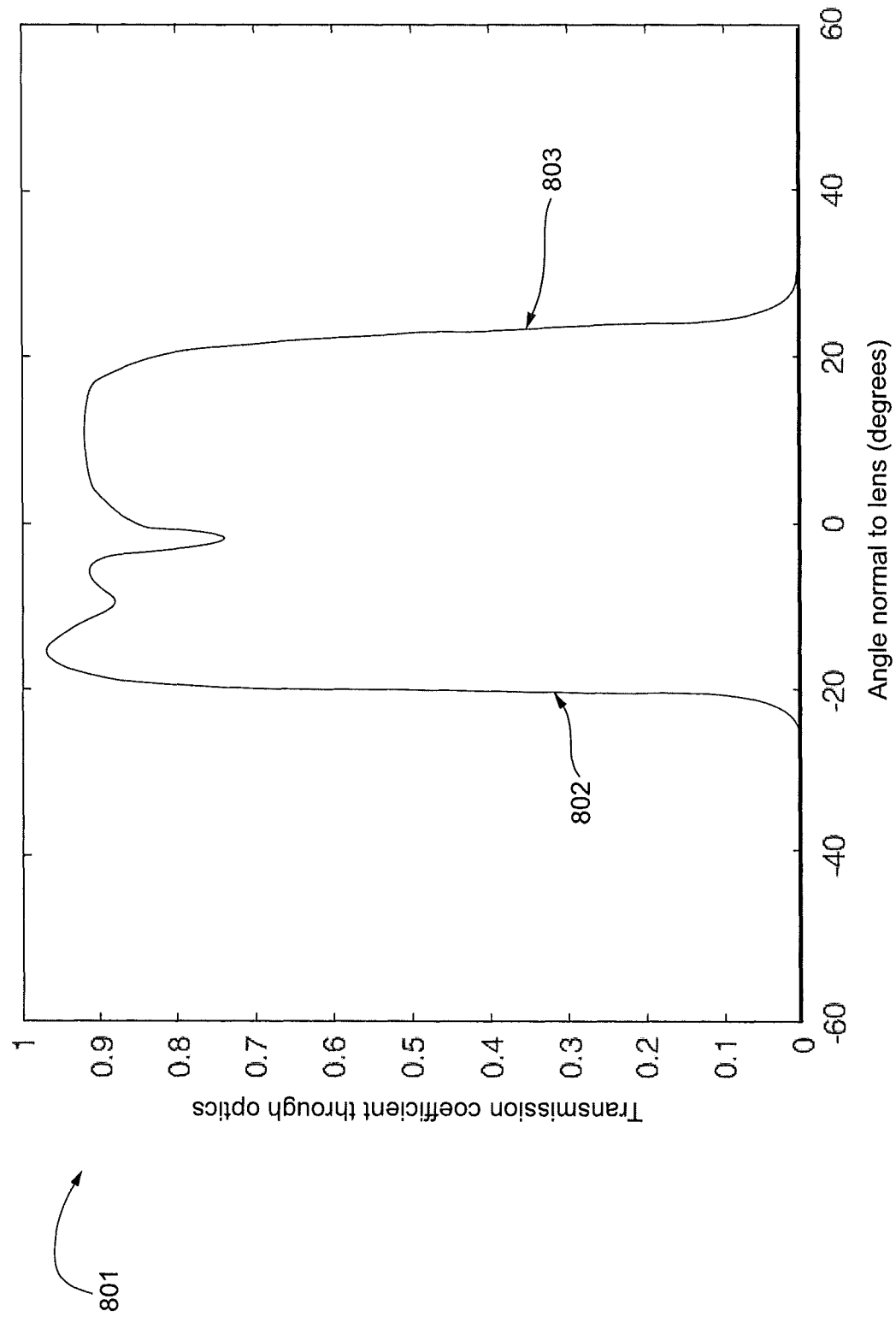
FIG. 8a schematically illustrates, in accordance with the present invention, a computer simulation of the optical transmission coefficient for an incident incoming light ray that passes through the optical element depicted in FIG. 4.

As mentioned earlier in relation to FIG. 4 the center of the optics 306 may be considered to represent the optical axis of the optical element 207 of smoke detector 401. The apparatus illustrated in FIG. 4 allows and provides for a narrow angular acceptance angle for incoming light such that a narrow band pass system is created in respect of such incoming rays. FIG. 8a. schematically illustrates a graph 801 of the transmission coefficients through the optical system seen in FIG. 4 in respective a single ray of light. It plots the transmission coefficient on the vertical axis relative to the angle of incidence of the light ray on the horizontal axis with an angle of incidence of zero degrees 0° being defined as normal to the lens (i.e at 90° to a tangent of the outer surface of the lens) and thus directed along the optical axis 306. As the skilled person in the art will understand from the graph a coefficient of 1 represents 100% transmission and a coefficient of zero represents 0% transmission. It is important to note that this graph is for an incoming scattered light ray that is incident on the optical element 207 of the smoke detector of FIG. 4. The angle is shown in degrees. It includes transmission losses for the case depicted of when the optical material used is polycarbonate. Thus, from FIGS. 8a and 8b it can be seen that the optical axis 306 is that axis wherein there is peak efficiency of the optics. Such peak efficiency is relative to 0° (zero degrees) in FIGS. 8a and 8b. From these graphs the critical angles 404 and 405 are defined. The preferred ranges of angles for angles 404 and 405 represent ranges over which their critical angles will remain cohesive over various suitable material types of which optical element 207 may be made. Furthermore they allow a reasonable degree of flexibility in order to allow the required transmission index of the type exemplified in FIGS. 8a and 8b. to be tailored to the requirements of a given smoke detector application.

FIG. 8a schematically illustrates, in accordance with the present invention a computer simulation, using the above-referenced Zemax® software, of the optical transmission coefficient for an incident incoming light ray that passes through the optical element depicted in FIG. 4. FIG. 8a shows that the system depicted in FIG. 4 provides sharp cut-offs 802 and 803 outside the ±20° acceptance angle. In other words at angles of incidence greater than approximately ±20° there is greatly reduced transmission of the incident scattered light that is received by the receiving surface (objective lens) 210. Importantly FIG. 8a shows the performance of a system where the light is impacting the centre of the initial lensing surface 210. However, FIG. 8a does not take into account off centre and off angle incident light as it only calculates the impact of an incoming ray hitting the centre of the lensing surface 210 along the optical axis 306.

Figure 8B:
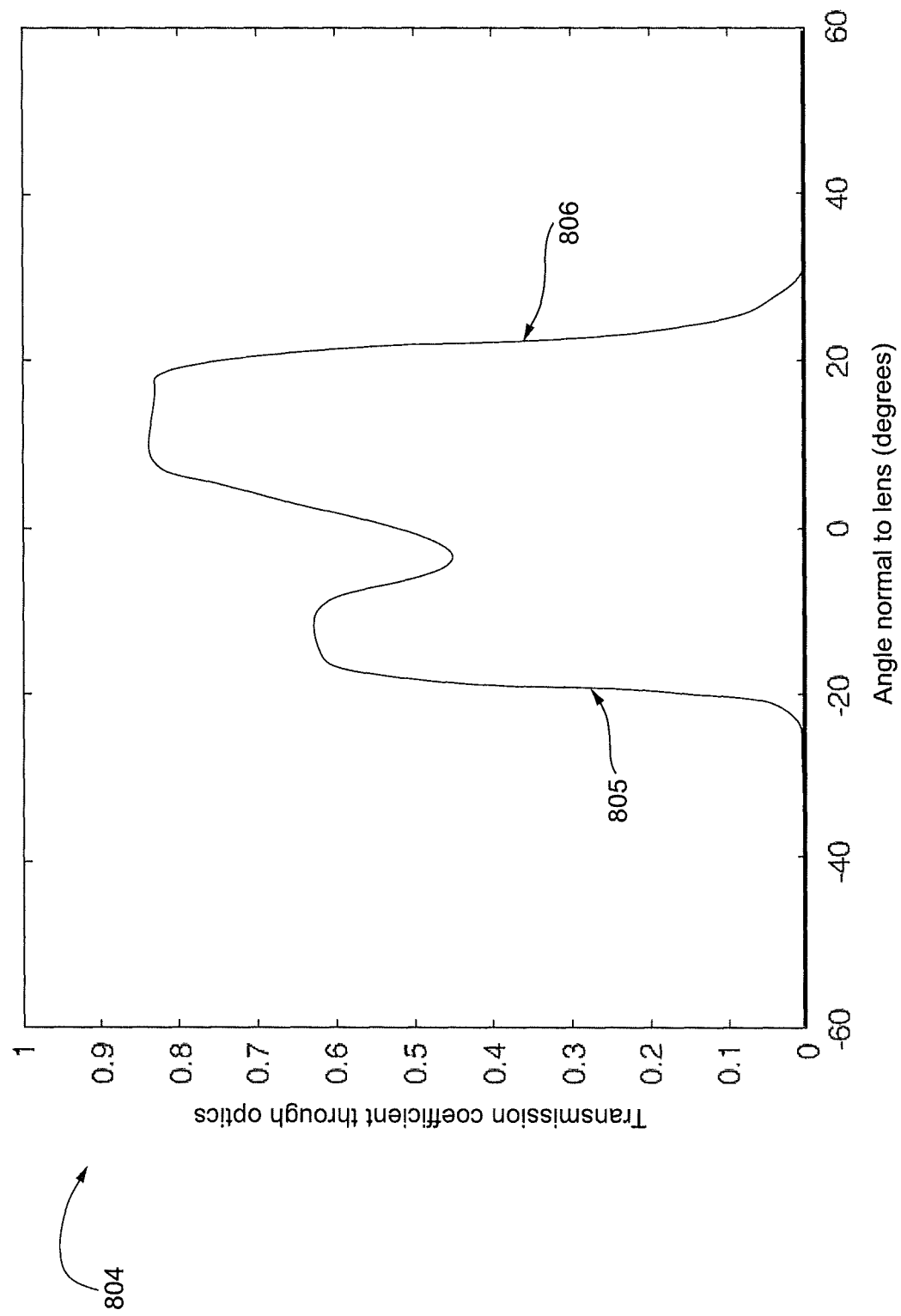
FIG. 8b schematically illustrates, in accordance with the present invention, a computer simulation of the optical transmission coefficient for incoming planar light (1 mm×1 mm plane) from a planar light source that passes through the optical element depicted in FIG. 4.

FIG. 8b shows the performance, as per a computer simulation using the above-referenced Zemax® software, of the system of FIG. 4 in relation to planar inputs of light. FIG.

8b. schematically illustrates a graph 804 of the transmission coefficient through the optical system seen in FIG. 4 in respect of a planar wavefront of light (1 mm×1 mm plane). In common with FIG. 8a, it plots the transmission coefficient on the vertical axis relative to the angle of incidence of the wavefront on the horizontal axis with an angle of incidence of zero degrees 0° being defined as normal to the lens (i.e. at 90° to a tangent of the outer surface of the lens) and thus directed along a plane that is shown side on as the optical axis 306. In common with FIG. 8a, again a coefficient of 1 represents 100% transmission and a coefficient of zero represents 0% transmission. It is important to note that this graph is for an incoming planar wavefront of light that is incident on the optical element 207 of the smoke detector of FIG. 4. The angle is shown in degrees. It includes transmission losses for the case depicted of when the optical material used is polycarbonate.

As is shown by FIG. 8b the system depicted in FIG. 4 provides sharp cut-offs 805 and 806 outside the ±20° acceptance angle. In other words at angles of incidence greater than ±20° there is effectively no transmission of the incident planar scattered light that is received by the receiving surface (objective lens) 210.

In contrast to FIG. 8a, it is thus shown in FIG. 8b that the design is also tolerant, whilst maintaining performance, to a planar wavefront rather than merely in relation to a single light ray transmitted along the optical axis. Thus, FIG. 8b shows light not from a single ray, but from a planar light source incident on the optical element 207 and it further highlights the durability of the optics as per the angular ranges specified in defined in FIG. 5.

It is important to distinguish between FIGS. 8a and 8b. As those skilled in the art will appreciate, FIG. 8a shows the system seen in FIG. 4 when only light rays are striking the centre of the primary surface (6). FIG. 8b, shows the system being more robust, with increased acceptance and rejection of multiple light rays that comprise a broad range of incident angles of light rays impacting the primary light receiving surface/the primary lens, 210. For both FIGS. 8a and 8b the actual cut-off to zero transmission is seen to be just beyond ±20° and thus for zero transmission the range is more accurately specified as ±25°. In certain applications the inventors thereby contemplate that the invention may potentially work adequately at the half angle up to and including ±25° rather than only in the best mode/highly preferred range of ±20°.

The present invention works over a broad range of optical media, key materials comprising thermoplastic polymers and glass. A highly preferred thermoplastic polymer is that of polycarbonates (PC) as constitute a group of thermoplastic polymers containing carbonate groups in their chemical structures and which are frequently used in engineering in view of them being strong, tough materials that are easily worked, moulded and thermoformed and because certain ones are transparent. The dimensions and specifics described in the present disclosure and shown in the figures are for the specifics of using a polycarbonate or an acrylic for the body of the optical prismatic element 207. The angles 404 and 405 may be altered or 'tuned' in order to take account of different refractive indexes of particular optical media. This process of tuning of the angles 404 and 405 effectively allows for different optically transparent materials, other than a polycarbonate or acrylic materials, to be used. As those skilled in the art will understand, a given material that is selected for use can be enhanced by being coloured and/or doped as required to provide the required filtering of light for a given smoke detector application. Furthermore, films of selected materials may also be applied to surfaces, such as polarisers, to provide further filtering of light that is received by a given optical element such as the exemplary and best mode optical element 207 of FIGS. 2 to 8.

The exemplary and best mode optical element 207 described and discussed in relation to FIGS. 2 to 8 is part of a broader system that constitutes a smoke detector unit that is complete and in a form for use by the public. Thus, as indicated in FIG. 2, optical device 207 is intended for internal mounting in a photoelectric smoke detector unit having an outer casing. Both the optical element 207 and the broader system were designed using 'Optics Studio 17' released from Zemax LLC. As those skilled in the art will appreciate, this is a ray tracing program that allows for the simulation of the broader system. In order to arrive at an optimum design/shape of an optical element such as optical element 207, iterative models are also preferably used in order to introduce real-world variances into the design. Such an optical design software system, the example provide being that of Zemax LLC, is provided with built in options as regards the optical materials that may be used as per a simulation of a given set-up. Thus, for example, the software provides for polycarbonate with its associated refractive index and other relevant properties so that simulation may be performed directly by the software.

Figure 9:
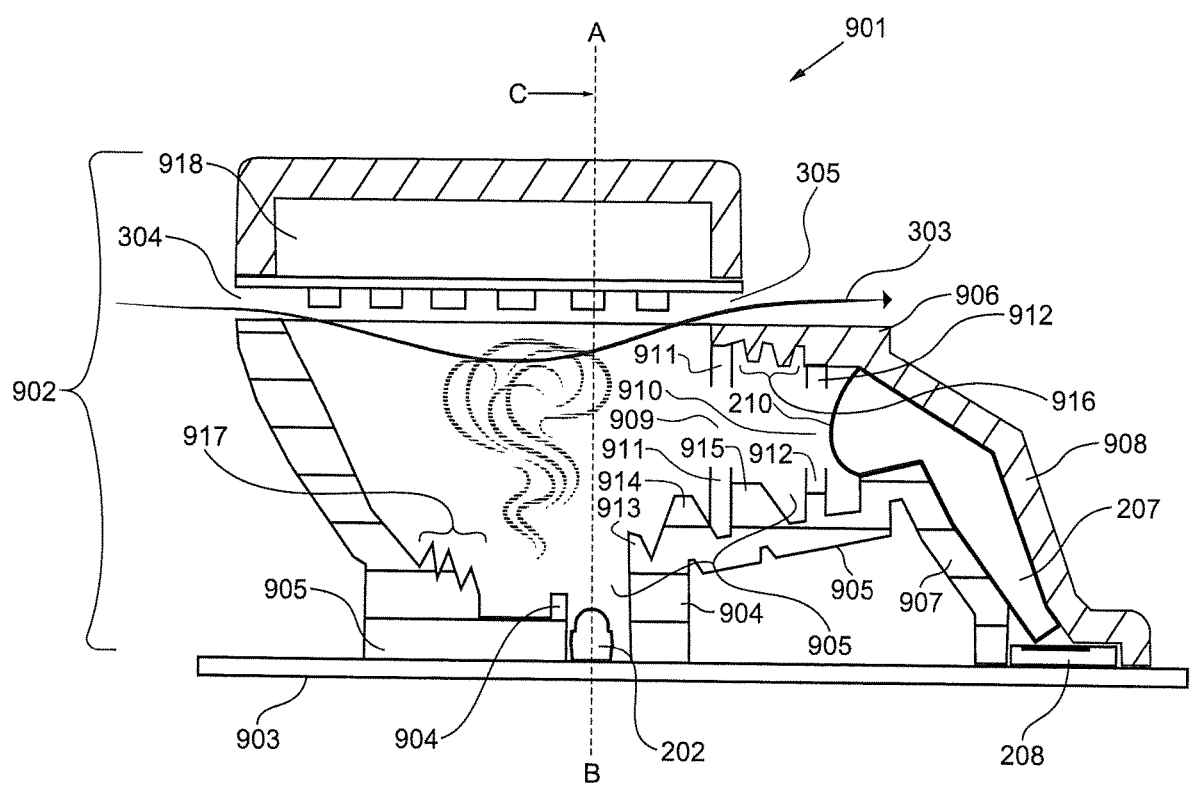
FIG. 9 schematically illustrates a side elevation view of the best mode contemplated of a substantially complete smoke detector of the type depicted in FIG. 2 that is thus in-situ in a housing as forms a walled chamber that defines a scattering volume for smoke to enter.

FIG. 9 schematically illustrates a side elevation view of the best mode contemplated of a substantially complete smoke detector 901 of the type depicted in FIG. 2 that is thus in-situ in a housing as forms a walled chamber that defines a scattering volume for smoke to enter. FIG. 9 is substantially identical to FIG. 3 (with air comprising smoke thus labelled as 303 passing through), save for the upper (top/roof) surface of the device where additional 'baffle' features are shown. Furthermore, chamber 902 is substantially the same as chamber 310 of FIG. 3 except that further detail is provided/explained herewith in relation to collimation and obscuration of light within the chamber. Thus, the optical element 207 is shown working within and in conjunction with the smoke detector chamber 902. Chamber 902 is principally centred on LED 202 which is surrounded by an initial collimator structure 904 as may suitably substantially form a cylinder (shown in cross section in the figure) in the case of an LED device 202 that is circular in a plan view as looked upon from above. In this way, direct light from the LED 202 is collimated using the initial collimating structure 904. The collimator may be moulded as part of a bigger structure that forms the inside surface of the encapsulating walled chamber 902. Extending from the collimator 904 is a further extruded/moulded region that extends substantially sideways from the collimator and which comprises a floor region 905 and an upper/side region 906 and which thereafter merely surrounds optical element 207 as indicated at 907 and 908. The floor region 905 and upper/side region 906 form the walls of part of a substantially cylindrical region (again shown in cross section in the figure) that comprises respective openings or windows 909, 910 located in front of the receiving surface 210 of optical element 207. Thus window 909 as is closest to the light source is formed by a planar structure 911 that extends from the chamber walls and which thus has a hole in the centre to thereby constitute the window. Similarly window 910 as is adjacent to and parallel to window 909, but closer to optical element 207 than is window 909 is formed by planar structure 912. The floor region 905 further comprises protrusions that extend substantially vertically upwards from the remainder of floor region 905, such as respective protrusions 913, 914 and 915 as are respectively located in between the light source 202 and optical element 207. In a similar manner upper/side portion 906 comprises protrusions that are generally indicated at 916 and which thus extend substantially vertically downwards from the remainder of the upper/side portion 906 into the space as constitutes the chamber void below. To the left of light source 202 in FIG. 9 there are additional protrusions, generally indicated at 917, as extend substantially vertically from floor 905.

Direct light from the light source 202 is thus effectively collimated using the initial collimating structure (obscuration) 904 as substantially surrounds the light source to provide a cylindrical aperture from which the light from source 202 thus emanates. The respective protruding planar surface structures 911 and 912 as each comprise an orifice to provide respective windows 909 and 910 may suitably each be formed by planar extrusion (i.e. in 1-dimension). These respective planar structures 911 and 912 provide multiple edges on the primary chamber surface in such a way as to block direct light and thereby functioning as the key collimator, while also effectively increasing the tolerance of the smoke detector from insects and dust. This primary collimator is thus in the form of blank windows in the surface structures 911 and 912 in such a way as to reduce light entry from outside the required angles that the optical element 207 is effectively tuned to collect and transmit through to the photosensitive element 208. The multiple protrusions 916 as extend from the upper/side region 906 into the chamber are provided to reduce the impact of stray light, decrease the impact of dust on the system and increase the insect tolerance of the system.

The device illustrated in FIGS. 3 and 9 is such that the chamber wall of the bottom portion of the device forms a generally oval shape in the cross sectional side view depicted. The oval shape allows for a further decrease in unwanted reflected light. Light traps such as that shown at 917 to the left of light source 202 are suitably constructed as part of the floor region (bottom surface) of the chamber 902 and are used to decrease the background levels of scattered light from direct reflections from the upper/side region 906 and roof 918. The angular selectivity of the device means that these reflections thus have a minimal impact rendering such background light levels as being substantially prevented from affecting the light collection and processing functions of the optical element 207. Due to the nature of the angularly selective optical element 207 in the device, many features in the chamber are preferably smooth in terms of their general shape. As those skilled in the art will appreciate this is a benefit in terms of manufacture of the smoke detector device because it increases the ease in which such a device can be injection moulded as the surfaces will be largely featureless. Injection moulding technology is preferred in terms of manufacture of a smoke detector as configured in accordance with the present invention. While other manufacturing technology, such as CNC machining, may be used instead of injection moulding it is generally less preferable due to higher inherent costs of production.

Figure 10A:
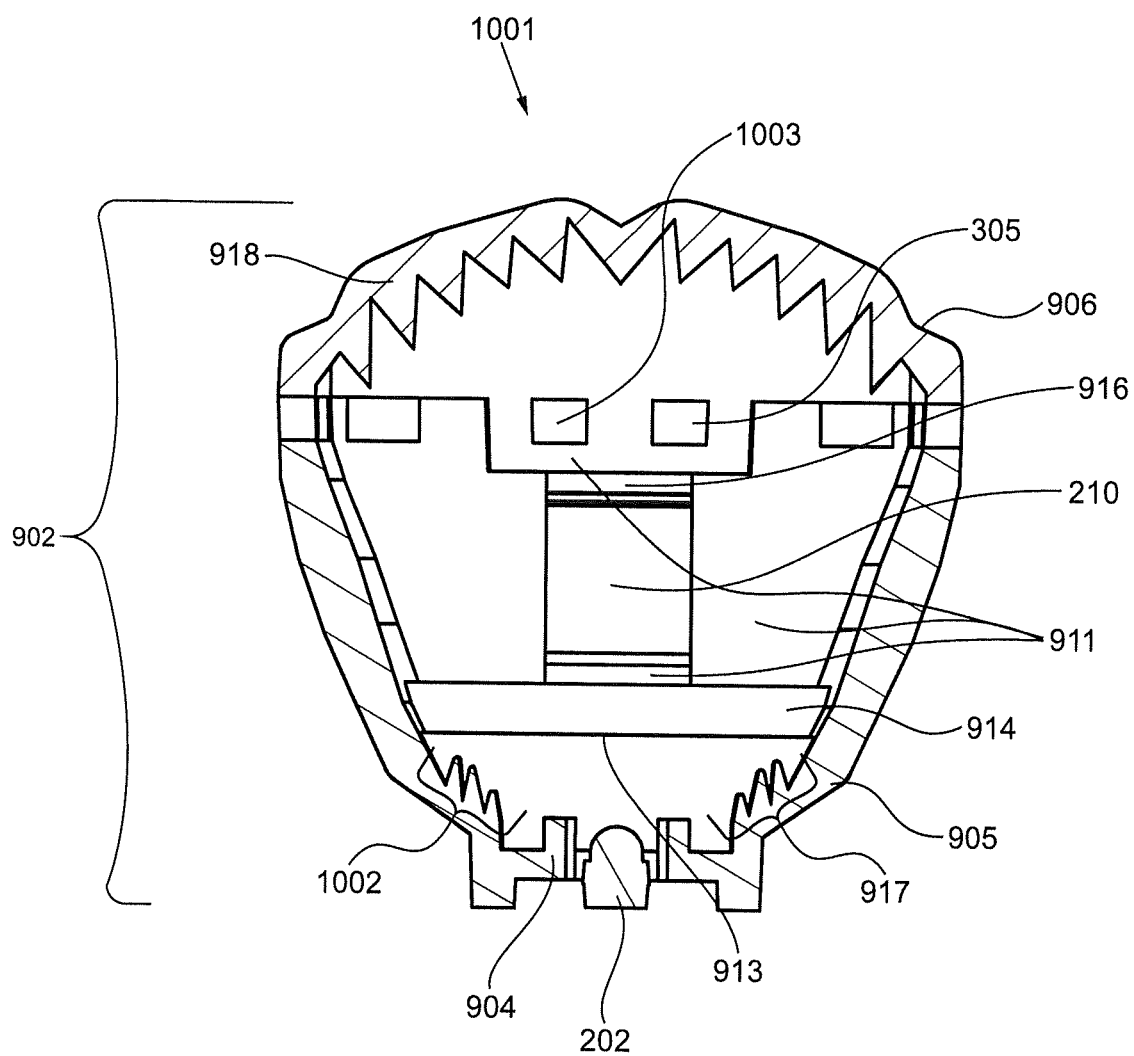
FIG. 10a schematically illustrates a cross-sectional view about the vertical broken line A-B in FIG. 9 looking in the direction of arrow 'C' and thus represents a view of the inside of the smoke detector at 90 degrees relative to the view provided by FIG. 9.

FIG. 10*a* schematically illustrates a cross-sectional view about the vertical broken line A-B in FIG. 9 looking in the direction of arrow 'C' and thus represents a view of the inside of the smoke detector at 90 degrees relative to the view provided by FIG. 9. In this way FIG. 10*a* thereby shows further detail associated with the roof 918 of the chamber 902.

Figure 10B:
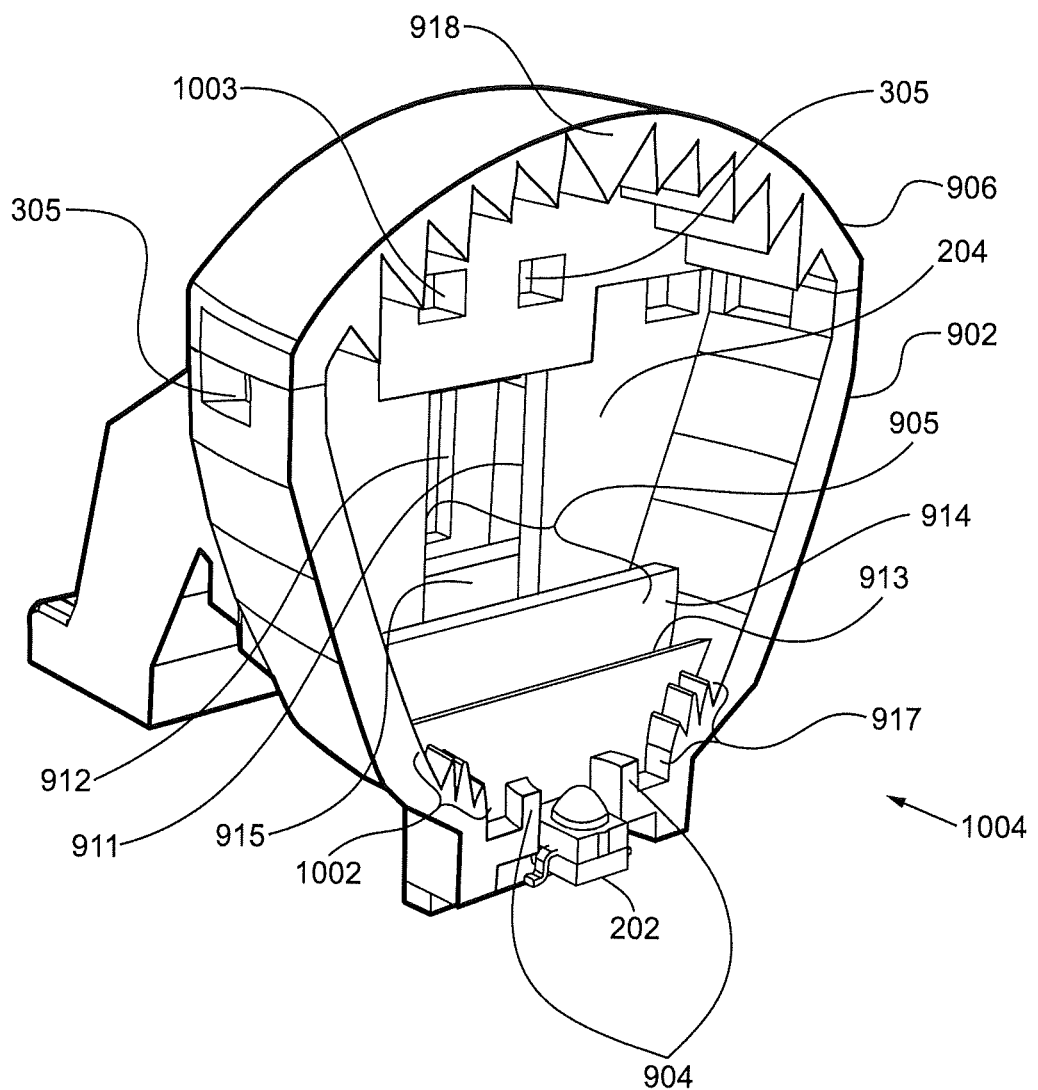
FIG. 10b shows a view that is similar view to that of FIG. 10a, but from a slight angle such that a perspective view 1004 is thereby provided.

FIG. 10*b* shows a view that is similar view to that of FIG. 10*a*, but from a slight angle such that a perspective view 1004 is thereby provided. These figures show more clearly the airflow inlet/outlet duct 305 and a second air inlet/outlet duct 1003 that is substantially parallel to duct 305. Similarly these views show the lateral obscurations 917 and a corresponding portion 1002 thereof on the opposite side of the chamber. The roof 918 of the chamber is seen to be raised in an arch above the line of sight of the optical element 207 (i.e above a level at which the light receiving surface 210 of optical element 207 is physically positioned). Rather than working purely as an optical absorber of unrequired light, roof 918 is configured such that its surface internal to the chamber is simultaneously configured to function as both an absorber and a lens. In other words, roof 918 is configured primarily to absorb light that is incident upon it, but for any light that is not so absorbed then it is additionally configured to redirect this light out of the viewing angle of the optical element 207. This approach to how the roof 918 is configured is advantageous in that the overall size of the chamber is substantially reduced in comparison to typical known smoke detectors. The roof design just described and illustrated is assisted by the obscurations depicted at 917, 1002 which constitute part of a ring absorber as further helps to reduce the background light levels.

In FIGS. 10*a* and 10*b* the initial collimator 904 flanks the light source 202 and thus constitutes a key component that limits the direct light from the light source 202 from being directed anywhere other than it being directed upwards into the sensitive region/scatter volume 204. While an optical lens above light source 202 may be included to focus the light, the present invention does not require such a lens as an essential element and hence the reason for one not being shown.

The respective obscurations or struts 913, 914 and 915 are shown in FIGS. 9, 10*a* and 10*b* to comprise planar struts that provide a primary means of removing unwanted light outside of the field of the view of the optical element 207. However, for light reaching these structural elements 913 to 915, the optical rejection of the system not only further increases tolerance from undesirable light from the LED 202, but also assists in tolerance from light that contaminates the system through the air inlets/outlets (304, 305). Further, the heights of the struts 913, 914 and 915 are such as to block any scattered light as may originate from insects present on the upper surface of floor 905. As a result of the above, the separation between the LED 202 at the bottom of the device to the top of the roof of the chamber 918 is reduced to approximately 23 mm, with larger separations giving improved chamber performances.

Further reductions in overall size are possible, but this increases the ratio between background light contamination (that reflected off of the internal surfaces of the chamber) and the scattered light that is derived from scattering by the smoke. As those skilled in the art will understand this typically presents a compromise situation between chamber height and background contamination level with the precise configuration thereby substantially depending on the particular requirements of a given system.

Figure 11:
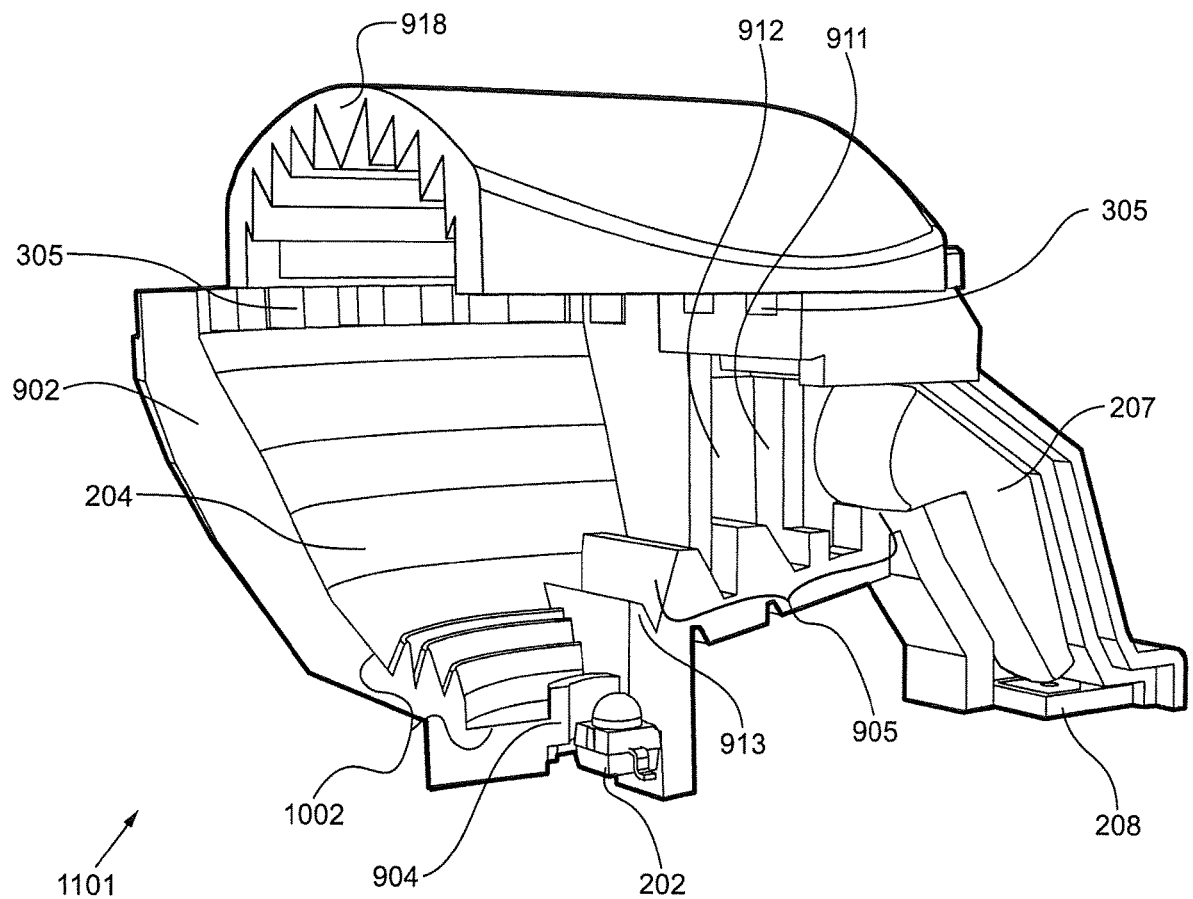
FIG. 11 schematically illustrates, in cut-away perspective view, the best mode of the smoke detector device depicted in FIGS. 9 and 10 in order to further illustrate the interrelationships between the chamber and the internal components thereof.

FIG. 11 schematically illustrates, in cut-away perspective view, the best mode of the smoke detector device depicted in FIGS. 9 and 10 in order to further illustrate the interrelationships between the chamber 902 and the internal components thereof as comprise the scatter volume 204, light source 202, optical element 207, floor 905 and its associated obscurations 913, 914, 915 and absorbers 917, 1002 etc. FIG. 11 constitutes a view 1101 that is similar to the cross sectional view of FIGS. 3 and 9, but at a slight angle and such that the nearside chamber wall has been cut away in order to be able to see the componentry inside the chamber.

Also the base/PCB has been removed merely to focus on the structure of the chamber 902 and the internal components thereof.

Figure 12A:
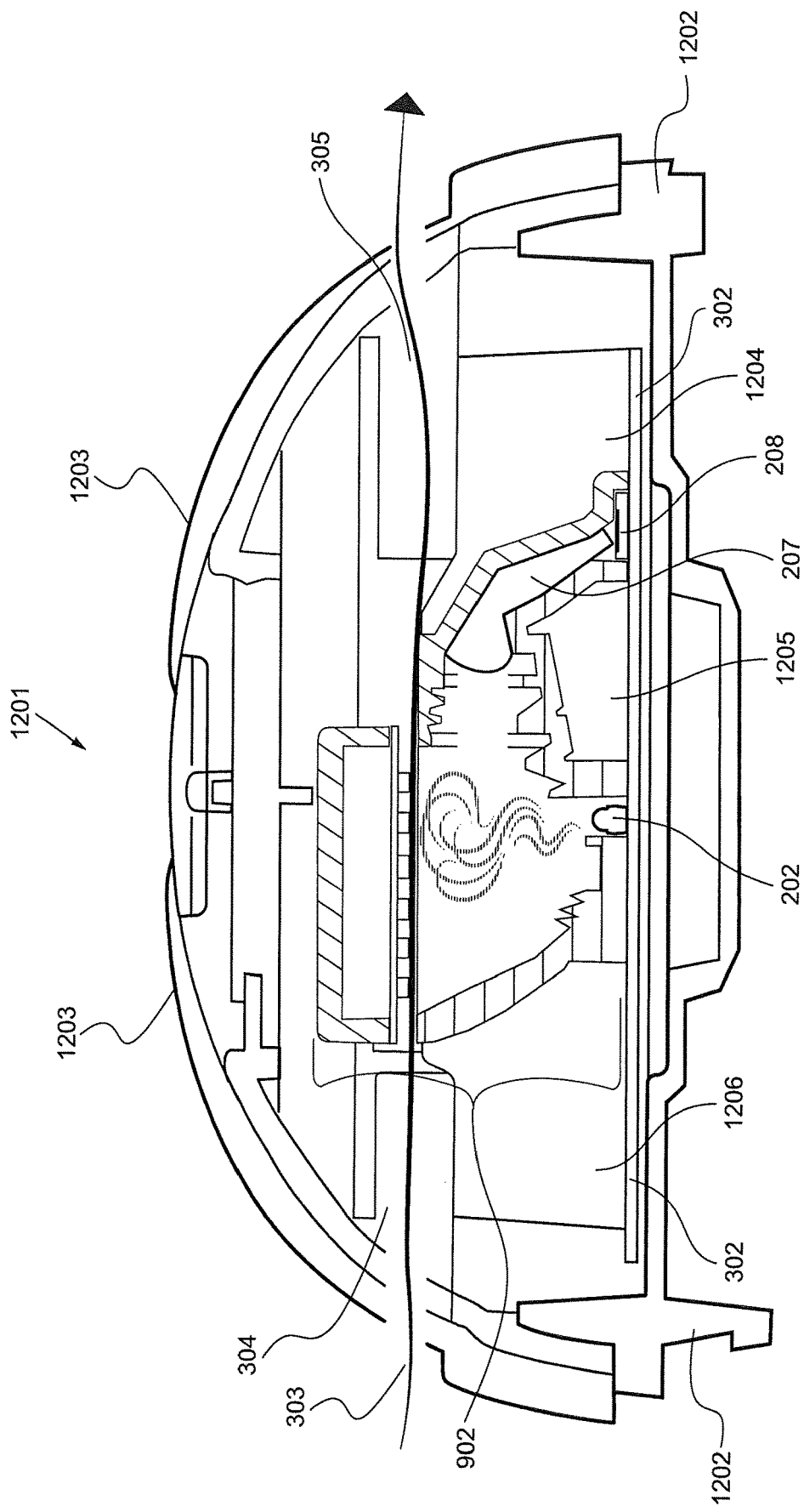
FIG. 12a schematically illustrates a side elevation view of a complete smoke detector unit 1201 as comprises a casing in order to house the best mode device illustrated in FIGS. 9, 10 and 11.

FIG. 12a schematically illustrates a side elevation view of a complete smoke detector unit 1201 as comprises a casing in order to house the best mode device illustrated in FIGS. 9, 10 and 11. In this way, FIG. 12a thereby further schematically illustrates how the optical element 207 and the associated chamber are nestled in a more global setting of a photoelectric smoke detector unit configured in accordance with the present invention. The chamber 902 is designed to be nestled inside a smoke detector housing (casing) that comprises the remainder of the smoke detector including any additional components such as may be desired (e.g. CO sensor etc.). Thus, the chamber and its internal componentry as hereinbefore described is shown in cross section view 1201 in FIG. 12a in-situ inside a suitable smoke detector housing as comprises a lower (base) portion 1202 and an upper portion (lid) 1203 that is preferably detachably interlockable and removable (or substantially removable) with respect to the base portion 1202. The airflow inlet/outlets 304, 305 are shown with arrow 303 representing the passage of air flowing through the particular duct that extends between the respective airflow inlet/outlets. In practice an optimal preferred design is such that a single passage or an array of such passages may be provided such that it or they merely comprise elongate openings in the casing. Suitably the casing may be made of any appropriate material such a rigid plastics material.

Also illustrated in FIG. 12a is the fact that the design of the overall smoke detector is such that there is provided a large amount of space underneath the chamber and surrounding the chamber and thus this represents usable space on the PCB 302. This 'freed up' space as is seen above the PCB 302 at, for example, 1204, 1205 and 1206 provides a significant benefit during electronic design as compared with the known prior art devices discussed herein-above because it enables the smoke detector unit as a whole to incorporate other sensors and the like.

Figure 12B:
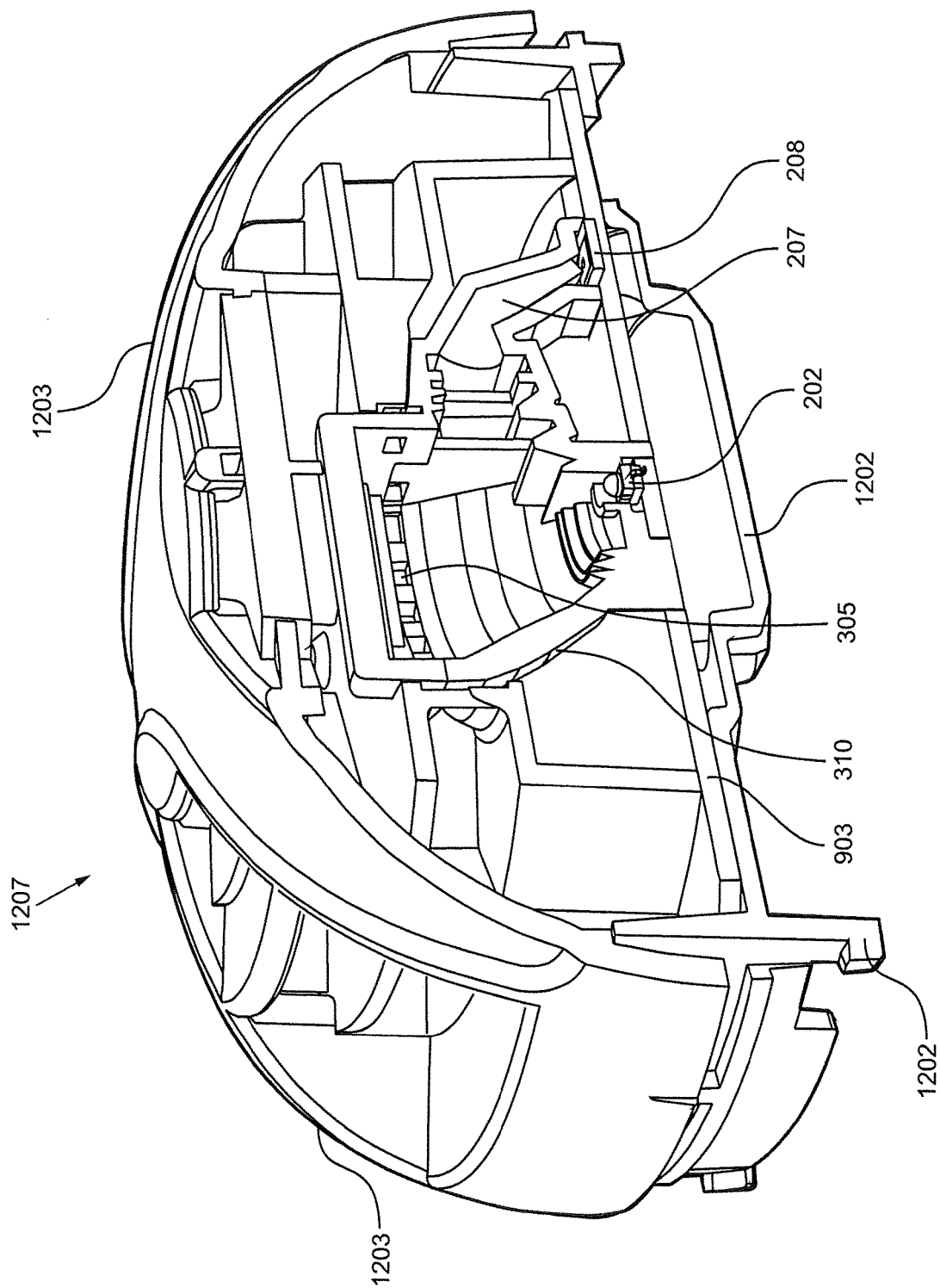

FIG. 12b schematically illustrates a perspective view 1207 of the complete smoke detector unit 1201 of FIG. 12a. In this way, FIG. 12b thereby further schematically illustrates how the optical element 207 and the associated chamber are nestled in and sit within a more global setting of a photoelectric smoke detector unit as configured in accordance with the present invention.

Figure 12C:
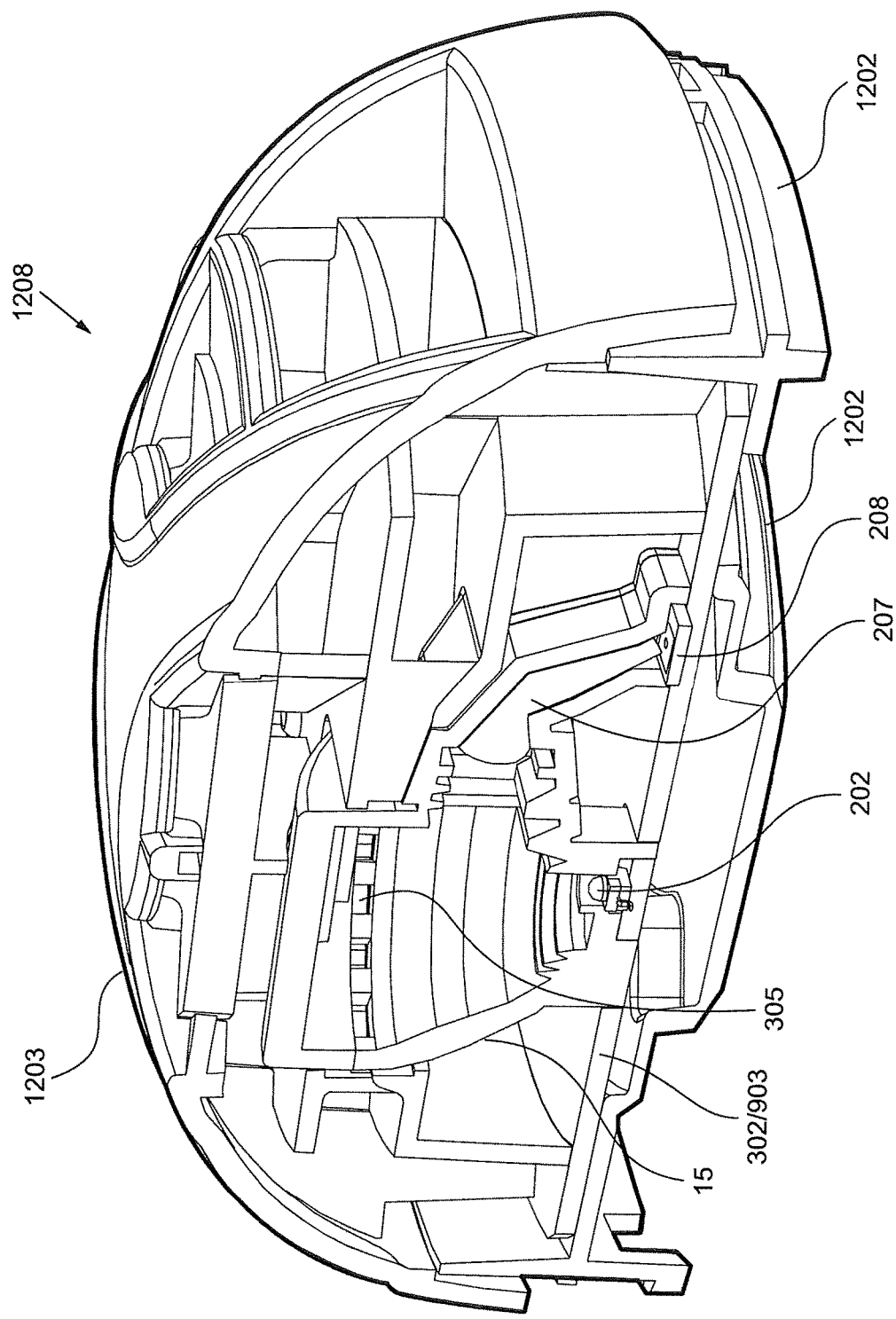
FIG. 12c schematically illustrates another perspective view of the complete smoke detector of FIGS. 12a and 12b.

FIG. 12c schematically illustrates another perspective view 1208 of a the complete smoke detector unit shown in FIGS. 12a and 12b in order to further illustrate how the optical element and the associated chamber are nestled in and sit within a more global setting of a photoelectric smoke detector unit as configured in accordance with the present invention.

FIGS. 12a to 12c show an ideal complete total smoke detector system, with incoming airflow 303 as may comprise smoke, that comprises several important improvements as compared with existing prior art smoke detector units. These improvements comprise, for example, that the design has a high tolerance to external light sources. These are light sources that are coming from outside the total system. This is due to the fact that the optics of the system, as are provided by optical element 207, are focused on a specific area at the back of the system, therefore making the smoke detector highly tolerant to light entry along the top of the design at the interface between the chamber wall and the top or head portion of the light re-direction structure (optical element) 207. Due to the durability of the optically sensitive angles discussed earlier in relation to FIG. 5, the design is highly tolerant to light contamination from the external environment.

Further Expansions/Modifications to the Preferred Embodiments

Multiple Wavelengths Performance

The optics described hereinabove perform not only the visible part of the electromagnetic (EM) spectrum of radiation, but over a range of wavelengths from/including the ultraviolet (UV) to/including the infrared (IR). The optics of the exemplary type described in relation to the best mode optical element 207 is such that it allows for processing of multiple wavelengths in such a way as to provide improved performance. This multiple wavelength approach may be performed through use of an LED 202 that transmits EM radiation (i) of a single wavelength or (ii) of multiple wavelengths or it may be realised through use of multiple LEDs that each respectively transmit EM radiation at different wavelengths to one another. This is highly beneficial/useful for various applications because different types of smoke are sensitive to different wavelengths of light. In other words, the use of differing wavelengths allows the system to be tuned to accept/reject differing types of smoke.

Tuneable Viewing Angle—Rotation of Optical Element 207

As will now be understood from the above description of the present invention it is necessary or at least highly desirable for a given smoke detector system as configured in accordance with the present invention to be substantially tolerant to EM radiation/light as is incident on optical element 207 from multiple angles of incidence that are outside of a predetermined range of angles of incidence that relate to EM radiation/light that is required to be detected. This requirement is readily and easily achieved through creating a system where the optical termination i.e. 'cut-off' as to incident angles accepted and processed and those that are rejected is variable in the sense that the apparatus may be tuned to accept a particular range of angles of incident EM radiation/light whilst rejecting others outside the required range of incidences. As those skilled in the art will understand, such a variable system, may be readily realised from changing one or more of several physical parameters of the apparatus, such as notably: (i) shortening the overall length of the optical element 207 and/or (ii) providing a different physical light sensitive component 208 and/or (iii) altering the position or viewing angle about the optical axis 306.

The benefit of such a smoke detector system/apparatus is that it can allow for multiple scatter angles to be viewed by the optical element 207. This viewing may be either simultaneously, or through a modified system which is tailored to certain acceptance/rejection angles for tailored applications.

It will be appreciated by those skilled in the art that different types of smoke scatter EM radiation/light at different angles, dependent on the wavelength of the radiation. Thus, through changing the acceptance angle for required scattered EM radiation/light, a given smoke detector as configured in accordance with the present invention may effectively be tuned as required to accept/reject EM radiation/light from different types of smoke. Furthermore such a system would also allow for the individual identification of forward scatter and back scatter phenomenon which may also find beneficial use in certain applications of a smoke detector.

Figure 13:
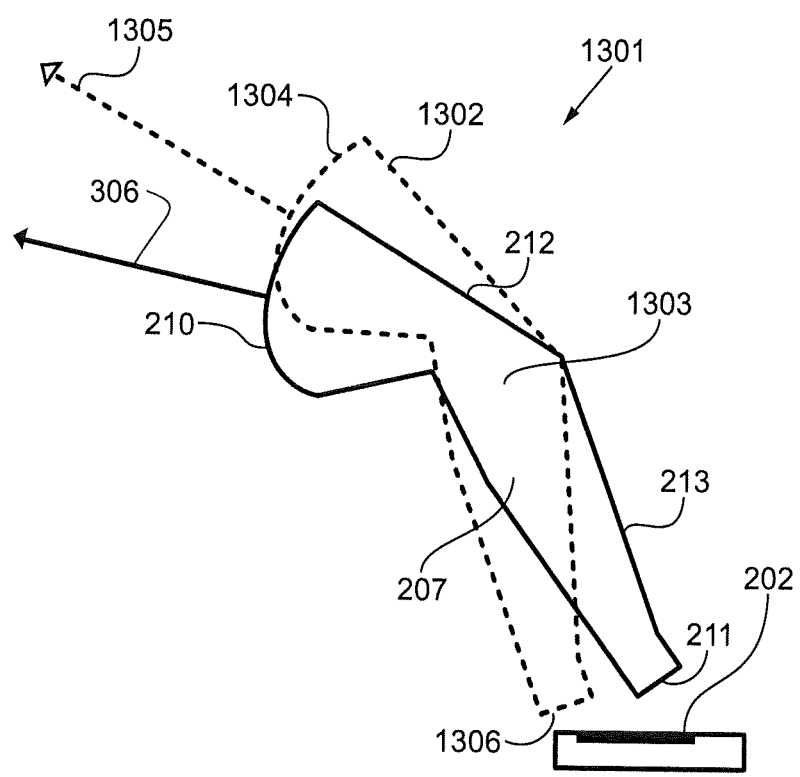
FIG. 13 schematically illustrates in side elevation view how the optical element of the invention as per FIGS. 2 to 12c may be rotated to obtain different selectable viewing angles as may be required.

FIG. 13 schematically illustrates in side elevation view 1301 how the optical element of the invention as per FIGS. 2 to 12c may be rotated to obtain different selectable viewing angles as may be required. The angular selectivity of the smoke detector device that the arrangement depicted in FIGS. 2 to 12*a-c* may realise, can be conveniently achieved through merely rotating the optical element 207 about a suitable point. Thus, keeping the angular relationship as between primary prism surfaces 212 and 213 fixed, the entire optical element 207 may be rotated in a vertical plane to the position 1302 (shown in broken lines) in order to change the detected angles of incidence of EM radiation/light that are ultimately transmitted through to sensor 202 by the optical element 207. In this way different viewing angles are thereby selectable in accordance with the requirements of a given smoke detector application that is to be provided. As illustrated, the rotation of optical element 207 in the example of FIG. 13 is about a point 1303 located inside the device and such that the light receiving surface 210 has been shifted to a higher position 1304 relative to its original position as has also the optical axis 306 which has been rotated upwards to the position indicated at 1305. Such rotation as per the example shown also results in a corresponding displacement of the light transmission surface 211 at the other end of the device which is thus seen at 1306 to be shifted to the left.

Tunable Viewing Angle—Modification of the Angular Relationship as Between the Respective Primary Prism Surfaces 212 and 213

The viewing angle can also be tuned through modifications of the angular relationship as between the respective key prism surfaces 212 and 213. Thus, configuring an optical element of the type 402, but with different angles to those of 404 and 405 (which are, as described for the best mode as per FIGS. 2-13 earlier each respectively 41°) allows for truncation or expansion of the viewing angle for a corresponding more or less tolerant system.

Increased Design Tolerance to Contaminants

The device further increases tolerance to contamination, such as dust. This is done through only being sensitive to a small region optically. Light reflected from dust which isn't in the sensitive region is rejected by the optics of the optical element 207 as previously discussed.

In environments at high risk of contamination, either from particulates/dust or insects and the like, it is desirable for there to be multiple modes of detection in order to ensure that a smoke alarm signal is only generated when actual smoke has been detected rather than merely a non-smoke contaminant.

Further, the present invention lends itself well to providing an expandable system that can be altered easily to accommodate further characteristics; for instance, the design allows for multiple optical elements (of the type exemplified by optical element 207 described above) at several angles to allow for what the industry knows as multi-mode detection, where there are multiple detection paths, increasing device performance and false-alarm tolerance.

Figure 14:
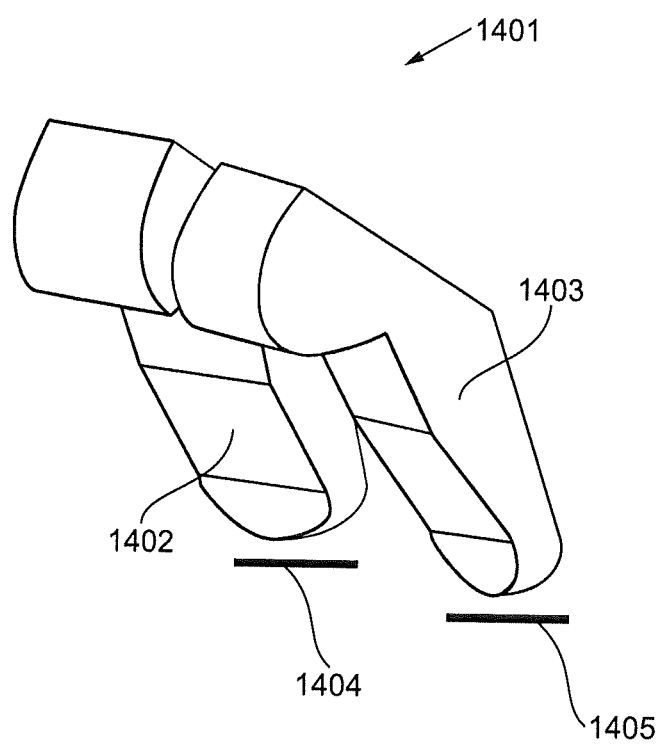
FIG. 14 schematically illustrates, in perspective view, a further preferred embodiment of the present invention wherein multiple (first and second) optical elements are used in tandem to provide increased tolerance to contaminants such as dust.

In order to provide such optimised functionality the present invention can be used in such a way as to have, for example, two rotationally offset sets of optics that complement one another by thus acting to provide two independent modes of detection. Thus, FIG. 14 schematically illustrates, in perspective view at 1401, a further preferred embodiment of the present invention wherein multiple (first and second) optical elements are used in tandem to provide increased tolerance to contaminants such as dust. FIG. 14 thus effectively shows how an optical element of the type 207 shown in FIG. 14 as optical element 1402 may be used in conjunction with another optical element 1403 that is substantially adjacent to the former. Thus optical element 1403 can therefore be used in conjunction with optical element 1402, but with appropriate independent rotation thereof in order to realise two independent modes (distinct types) of detection of smoke that are desired to be detected. In the example shown of using two such optical elements 1402, 1403 in relation to a single smoke chamber only an extra optically sensitive component is required such that each respective optical element thus directs collected and transmitted EM radiation/light to its associated sensor, respectively sensors 1404, 1405. Such a dual optics system removes the need for multiple light sources because both sensors can be placed and tuned to receive EM radiation from the same EM radiation source such as an LED, thereby conserving electric power as compared with traditional dual detector systems that require multiple radiation/light sources.

Increased Gain Systems

The apparatus and systems described above can be modified to increase the amount of light collected. One method for increasing the gain of the system (the amount of radiation/light received) is through increasing the effective size of the opening aperture that receives the EM radiation/light. This can be done through both increasing the extruded size of the optical system or through tapering the design. Referring to optical element 207 of FIGS. 2 to 13 this may be achieved through increasing the one dimensional depth of the optical element 207 or through increasing the surface area of the opening aperture/initial lensing surface 210 and tapering/altering this to direct at the same sensor (photodiode) 208. Because the lensing surface is curved a slight increase in its size substantially increases its overall surface area and hence also the gain of the system.

Application to Aspiration Smoke Detectors

As those skilled in the art will appreciate, a smoke detector as configured in accordance with the present invention may be used in an aspiration type smoke detector system. Aspiration detectors differ from traditional 'standalone' smoke detectors in that they rely on a forced flow of air through the system through use of an air pump wherein the source of the air is from one or more locations that are typically located remotely from the actual smoke detector sensor. For example, in this way the design illustrated in FIG. 9 is compatible for use in such aspiration detector technology. In terms of the present invention being applied in an aspiration detector system, then referring to FIGS. 3 and 9, the air flow 303 is effectively provided by air obtained/sampled from one or more locations that are remote from the detector sensor and which is forced through appropriate tubing to the detector sensor by an air pump. Such an approach is to be contrasted with a system that utilises ambient air (as may comprise smoke and in which a smoke detector sensor is immersed) being merely ducted through the detector unit outer casing as is, for example, the case for the preferred embodiment of the present invention as per FIGS. 12*a*-12*c*.

Additional Points

The present invention as per the preferred embodiments described above is centred on the intentional rejection of unwanted light or more generally of unwanted EM radiation. The unique purpose of this is to miniaturise the overall size and thus materials consumed in manufacturing a 'total' or at least more holistic detecting system to save cost/space. Further, it does so while also allowing for dual SMT components as may be configured without a need for human operatives soldering and the like.

As described, the present invention uniquely uses lensing and prismatic elements in concert within the same optical element, such as that of 207, to actively create rejection of unwanted scattered light. These active prismatic surfaces work in concert with primary optics to be selective in the amount of light that is rejected by the design. This feature allows for higher levels of tolerance in the design and much sharper optical 'cut-offs' than is the case with all known smoke detectors known to the inventors of the present invention. As described in detail earlier, FIG. 8*a* shows the basic performance of the system, while FIG. 8*b* shows how the system is highly durable to unwanted light. As described in relation to FIG. 14, this rejection may be uniquely and purposely increased by the use of multiple optical elements working in concert.

The basic set-up of the present invention requires only a single optical element to achieve its purpose, in a system that could, for example, be assembled using two pieces of plastic (for an upper portion of sensitive chamber and lower portion), plus an optical element such as of the exemplary optical element 207. Relative to the smoke detection sensitive region, this specially configured optical element 207 is also on the side thereof as the photosensitive device 208 and allows the use of dual SMT components, that is both the light source 202 and sensor 208 may be realised as SMT type components.

This single optical element 207 on the side of the photosensitive device 208 relative to the smoke detection sensitive region is considered to be unique for designs incorporating SMT LEDs and SMT light sensitive elements. The present invention provides for a smoke detection region that is vertically above or substantially vertically above the light source/LED 202. This is due to the present invention lending itself to flat mounting of the LED 202 on the PCB with no special optics as such being required to be applied to the LED 202. Dissimilarly the smoke detection region of JP2016200979 (Hochiki Co) is not directly in front of either the LED or photodiode sensor and it requires two optical elements to redirect the light. The present invention is also dissimilar to GB2531495 (Apollo Fire Detectors Limited) in that it provides the optical element 207 on only the light sensor side of the smoke detection region.

Important differences of the present invention as compared with the disclosure of JP2016200979 A (Hochiki Co) comprise:

in the best mode, the present invention uses only a single optical element as compared with two which thus implicitly take up more PCB space;

the present invention provides an optical element which is Inward facing' such that optical processing is performed within the body of the optical element itself and which therefore facilitates the provision of a highly compact smoke detector device;

the present invention provides a primary receiving optical surface and at least one, but preferably a plurality, of 'downstream' optical prismatic elements or surfaces in order to thereby provide a processing arrangement that creates sharp 'cut-off' outside required well-defined viewing angles. This active optical manipulation/processing is in sharp contrast to the disclosure of Hochiki as per the reflection coefficient plot depicted in their FIGS. 3A and 3B which is merely reliant on the natural roll-off of the medium (polycarbonate) of which the optical element is made rather than any such active manipulation. As described above the present invention as per the best mode contemplated has an acceptance angle of approximately ±20° as opposed to a much wider angular range that the inventors of the present invention submit would clearly be the case for the device of polycarbonate that is disclosed in JP2016200979 A;

the present invention is not reliant on having to provide a well-defined focal point and thus no focal planes as such are required to be provided. This is in sharp contrast to the device disclosed in Hochiki where the provision of such focal planes are inherent and necessary; and as an overarching summary the present invention effectively harnesses processing of light through pre-defined active rejection of certain incident angles whereas, in contrast, light rejection is undesirable for the device disclosed as per JP2016200979 A.

As mentioned above, the present invention allows fora more compact chamber than the prior art smoke detectors discussed hereinabove. It also allows the use of dual SMT components with the use of only a single optical element 207 on the photodetector side. This is done through allowing the light source 202 to shine light directly upwards (i.e. at 90° to the plane of the PCB), which is then captured and filtered by the optical element 207 before being redirected to the photosensitive element 208. This approach thereby raises the sensitive region off and away from the level of the PCB 302 allowing for a more compact product than is typical of prior art smoke detectors. As those skilled in the art will understand, this is of great importance because PCB space has both a financial and space cost in the design of a smoke detector.

The selective optics as described above constitutes the essence of the present invention and is, in itself, largely responsible for allowing a small size of a smoke detector as compared with those of the prior art. This advantage is provided through the optics 207 being selectively sensitive to only what is within the acceptance angle of the design, as shown and described earlier in relation to FIG. 4. The optical configuration of the chamber 902 is such that the unwanted light that is incident at angles outside the acceptance angle region (see FIG. 4) is thus filtered out and rejected. FIGS. 10*a-b*, 11 and 12*a-c* show one preferred apparatus and method of achieving this. Here the roof 918 of chamber 902 acts as both an absorber as a primary purpose and a reflector. The roof 918 is configured to absorb unwanted light, but when it doesn't it acts as in a manner similar to a quasi-Fresnel reflector, redirecting the light back towards the insensitive regions outside the acceptance angle of FIG. 4. Doing so, allows the total height from bottom to the top of the chamber to shrink to approximately 28 mm including the chambers plastic thickness.

The invention claimed is:

1. A smoke detector of the type that depends on the scattering of light by smoke particles comprising:

a chamber configured to receive smoke particles from an environment in which said smoke detector is required to detect smoke;

a source of light configured to project light therefrom such that light that is received by said chamber is scattered by said smoke particles;

an optical element said optical element having a light receiving surface in the form of an objective lens configured to receive light scattered by said smoke particles, said optical element having an optical axis defined as 0° being normal to said light receiving surface of said objective lens; and said optical element, upon receiving said scattered light, configured to selectively differentiate between required scattered light that is derived from a subset of pre-defined directions with respect to the angle of incidence upon said optical element and scattered light that is derived from other directions in order to thereby filter out the light that is not required and thereby redirect said required scattered light onto a photodetector that is configured to detect at least some of said received scattered light;

said smoke detector characterized in that:
said optical element comprises a primary prism to provide said differentiation, said primary prism having a first primary prism surface, a second primary prism surface, and said optical element having a secondary prism surface, wherein each of the first, second primary and secondary prism surfaces are flat, said first primary prism surface and second primary prism surface being located on a rearward side of said optical element, said rearward side being opposite said light receiving surface;

said secondary prism surface being disposed substantially diametrically opposite a point of intersection of said first primary prism surface and said second primary prism surface;

said prism thereby configured to substantially transmit said received light to said photodetector for a range of angles of incidence relative to said optical axis of up to ±25° and substantially reject incident light that is received from angles of incidence outside of said range ±25°.

2. A smoke detector as claimed in claim 1 wherein said objective lens is a non-classical optical lens specifically configured to provide non-linear functionality as regards transmission of light.

3. A smoke detector as claimed in claim 1 wherein said prism substantially transmits received light to said photodetector for angles of incidence relative to said optical axis up to + or/−20° and substantially rejects incident light that is received from angles of incidence outside of said range + or −20°.

4. A smoke detector as claimed in claim 1 wherein said primary surface is angled at 30° to 50° relative to said optical axis to provide said differentiation.

5. A smoke detector as claimed in claim 1 wherein said primary surface is angled at approximately 41° relative to said optical axis to provide said differentiation.

6. A smoke detector as claimed in claim 1 wherein said secondary prism surface is angled at 30 to 50° relative to said primary prism surface.

7. A smoke detector as claimed in claim 1 wherein said secondary prism surface is angled at approximately 41° relative to said primary prism surface.

8. A smoke detector as claimed in claim 1 wherein said optical element is configured to concentrate said differentiated required light.

9. A smoke detector as claimed in claim 1 wherein said optical element comprises a lens to direct and focus said differentiated required light on to said photodetector.

10. A smoke detector as claimed in claim 1 wherein said light source comprises a light emitting diode (LED).

11. A smoke detector as claimed in claim 1 wherein said photodetector comprises a photodiode.

12. A smoke detector as claimed in claim 1 wherein said optical element comprises an elongate body having a bend in the form of a dog leg.

13. A smoke detector as claimed in claim 1 wherein said optical element is made of a material that is substantially optically transparent to at least the visible part of the electromagnetic spectrum.

14. A smoke detector as claimed in claim 1 wherein said optical element is made of a polycarbonate.

15. A smoke detector as claimed in claim 1 wherein said optical element is made of acrylic or glass.

16. A smoke detector as claimed in claim 1 wherein, in addition to said first optical element, there is provided a second optical element configured to receive light as has been scattered by said smoke particles, said second optical element being rotationally offset from said first optical element such that said first and second optical elements each respectively act to provide an independent mode of detection.

* * * * *